United States Patent [19]

Yezrielev et al.

[11] Patent Number: 5,631,330

[45] Date of Patent: May 20, 1997

[54] PROCESS FOR PREPARING PHENOL-FUNCTIONAL POLYMER

[75] Inventors: Albert I. Yezrielev, Kendall Park; William E. Wellman, Edison; Ralph M. Kowalik, Bridgewater; George A. Knudsen, Scotch Plains, all of N.J.; Michael G. Romanelli, Brooklyn, N.Y.

[73] Assignee: Exxon Chemical Patents, Inc., Wilmington, Del.

[21] Appl. No.: 472,625

[22] Filed: Jun. 7, 1995

Related U.S. Application Data

[62] Division of Ser. No. 96,127, Jul. 22, 1993, Pat. No. 5,453,469, which is a division of Ser. No. 543,616, Jun. 22, 1990, Pat. No. 5,239,018, which is a continuation-in-part of Ser. No. 404,028, Sep. 6, 1989, abandoned.

[51] Int. Cl.$^6$ .......................... C08G 63/06; C08G 63/12
[52] U.S. Cl. .......................... 525/418; 525/450; 528/206; 528/209
[58] Field of Search .......................... 525/418, 450; 528/206, 209

[56] References Cited

U.S. PATENT DOCUMENTS

| 32,136 | 5/1881 | Sandhu et al. | 528/302 |
|---|---|---|---|
| 2,979,473 | 4/1961 | Heinrich et al. | 260/22 |
| 3,789,044 | 1/1974 | Taft et al. | 260/18 TN |
| 3,836,491 | 9/1974 | Taft et al. | 260/20 TN |
| 4,267,239 | 5/1981 | Thankachan et al. | 428/425.8 |
| 4,298,658 | 11/1981 | Thankachan et al. | 428/425.1 |
| 4,331,782 | 5/1982 | Linden | 525/173 |
| 4,343,839 | 8/1982 | Blegen | 427/340 |
| 4,365,039 | 12/1982 | Blegen | 524/773 |
| 4,374,167 | 2/1983 | Blegen | 428/141 |
| 4,374,181 | 2/1983 | Blegen | 428/423.3 |
| 4,416,965 | 11/1983 | Sandhu et al. | 430/109 |
| 4,444,980 | 4/1984 | Deex | 528/193 |
| 4,446,302 | 5/1984 | Sandhu et al. | 528/302 |
| 4,535,132 | 8/1985 | Ambrose et al. | 525/443 |
| 4,543,952 | 10/1985 | Shalaby et al. | 128/335.5 |

FOREIGN PATENT DOCUMENTS

| 0287233 | 10/1988 | European Pat. Off. |
| 2316289 | 10/1974 | Germany . |

OTHER PUBLICATIONS

Wang et al., Am. Chem. Soc., Div. Polm. Mater. Sci. Eng., 56,645 (1987) discloses the synthesis of liquid–crystal polymers by reacting p–hydroxybenzoic acid with a linear polyester diol.

Dickie et al., Eds. ACS Symposium Series 367, Am. Chem. Soc., Washington, D.C. 1988, pp. 335–348.

*Primary Examiner*—W. Robinson H. Clark
*Attorney, Agent, or Firm*—John F. Hunt; Richard D. Jordan; John J. Mahon

[57] ABSTRACT

Non liquid-crystalline esterphenol-capped liquid polymer and polyol compositions in combination with an amino crosslinking agent endow coating compositions containing them with the ability of providing films having superior properties. The esterphenol-capped polymers and polyols can be prepared by direct esterification of hydroxybenzoic acid without its decarboxylation.

51 Claims, No Drawings

PROCESS FOR PREPARING PHENOL-FUNCTIONAL POLYMER

This is a divisional of application Ser. No. 08/096,127, filed Jul. 22, 1993, U.S. Pat. No. 5,453,469, which is a divisional of U.S. Ser. No. 543,616 filed Jun. 22, 1990, U.S. Pat. No. 5,239,018, which is a continuation-in-part of U.S. Ser. No. 404,028 filed Sep. 6, 1989, abandoned.

BACKGROUND OF THE INVENTION

1. Field of the Invention

The present invention relates to liquid polymer and polyol compositions, solid crosslinked polymer compositions prepared therefrom, and methods for improving coating properties of films and surface coatings. It also relates to preparing polymers and polyols endcapped with phenolic functionalities.

2. Description of the Related Art

Coating formulations usually contain a number of components. A primary component is resin, which can be natural or synthetic. The resin acts as a polymeric coating binder, or polymeric coating vehicle for the coating formulation. In addition, most coatings require a solvent, and the coating may also contain a wide variety of additives. Further, many coatings also contain a crosslinking agent, which after application of the coating vehicle to a substrate, reacts chemically with the resin during a curing stage to produce a film containing a crosslinked network. The crosslinked network is necessary for production of good film properties. The curing stage can be conducted at ambient conditions ("air-dry system"), or at elevated temperatures ("baked system"). In either case, the solvent is evaporated during the curing stage, resulting in a coating film. A number of properties are important for the coating film, including hardness, flexibility, weather resistance (weatherability), chemical resistance, solvent resistance, corrosion resistance, adhesion to various substrates, impact resistance, and several others. The properties depend on many factors including type, molecular weight, monomer composition, and glass transition temperature (Tg) of the resin; type and amount of the crosslinker; curing conditions; curing catalyst; and additives. Variations of these parameters can be used to create a wide range of differences in film properties to fit requirements for a number of diverse applications. However, it is not always possible to optimize all of the desirable properties simultaneously.

For example, hardness and impact resistance are two desirable characteristics of coatings which are somewhat mutually exclusive since high hardness is usually associated with films having high Tgs. Conversely, high impact resistance is associated with low Tg. This necessitates a trade-off between high hardness and high impact resistance. It is frequently possible to optimize one of these properties, but at the expense of the other.

In European Patent Application No. 0 287 233 filed Mar. 28, 1988, and published Oct. 19, 1988, Jones et al. teaches a method to simultaneously obtain both high hardness and high impact resistance in a coating by employing liquid crystalline (L.C.) polymers. The L.C. polymers are characterized by containing mesogenic groups which impart the L.C. character to the polymer. The mesogenic groups are chemical structures that contain a rigid sequence of at least two, and frequently more, aromatic rings connected in the para position by a covalent bond or by other rigid or semirigid chemical linkages. In addition to the mesogenic groups, the polymers contain conventional polymeric units which are attached to the mesogens via a covalent bond.

Jones formulates these L.C. polymers with suitable crosslinking resins, such as aminoplast resins, to create coating vehicles which, upon curing by baking yield films which have both high hardness and high impact values. The enhanced properties are attributed to the L.C. interaction of the various polymer chains. A mesogen which is frequently used consists of the internal esters of two or more molecules of para-hydroxybenzoic acid (PHBA). This mesogen is connected to a polymeric polyol by esterification of the OH groups of the polyol with the residual carboxyl groups of the mesogen.

The L.C. polymers, while possessing good properties, have several drawbacks. First, the mesogenic groups are usually expensive to synthesize and incorporate into the polymer. For example, multiple PHBA end groups require a large quantity of PHBA and significantly increase the resin price. Second, the synthesis is complicated. In one method, the synthesis is based on the use of expensive and toxic dicyclohexylcarbodimide, which renders this method impractical from a commercial standpoint. Another method is based on direct esterification of PHBA with a polyester-diol at 230° C. in the presence of para-toluenesulfonic acid (p-TSA). Jones teaches that it is important that the acid catalyst be used and that the temperature be controlled to provide the predominantly L.C. phenolic oligoesters. Polymers produced in accordance with the teachings of Jones, however, result in material with poor color, an unacceptably high loss of PHBA via decarboxylation, and a sizable loss of phthalic acid from the polymer due to anhydride formation. In order to be commercially attractive, it would be very desirable to provide the enhanced properties associated with Jones's L.C. polymers without the above-mentioned attendant problems.

Efforts have been made to incorporate active phenolic functionalities into polymeric coating vehicles to enhance curing characteristics or the properties of the prepared coating. However, the coatings produced in accordance with the prior art are generally inferior or difficult to prepare.

U.S. Pat. No. 4,446,302, reissue U.S. Pat. No. 32,136 and U.S. Pat. No. 4,416,965, all three to Sandhu et al., disclose polyesters having recurring units derived from diols and diacids and recurring units derived from p-hydroxybenzoic acid. These polyesters are used in electrographic developer compositions. The polymers disclosed in Sandhu et al. have several disadvantages. The recurring units derived from PHBA are blocks of two or more units of PHBA. Also, the polymers have high molecular weight as evidenced by their high inherent viscosities of about 0.3–0.7, (MW 50,000–200,000). Finally, the polymers are carboxyl terminated since they are made from p-acetoxybenzoic acid.

U.S. Pat. No. 2,979,473 to Heinrich relates to an alkyd formed from a polyacid, a polyol and modifier comprising 30–70 mole % monocarboxylic aromatic acid containing from about 50–100 mole % of 2,4-dimethyl benzoic acid.

U.S. Pat. No. 2,993,873 to Heinrich relates to alkyd resins modified by reaction with hydroxybenzoic acids and cured by ambient or baked cures. In either case, no crosslinking agent is added. Rather, the cure proceeds via the unsaturated site in the alkyd resin and coatings produced therefrom do not include benefits achieved by incorporating a crosslinker.

U.S. Pat. No. 4,543,952 to Shalaby discloses copolymers formed by the polycondensation of PHBA, an acid anhydride and diol. As in the Sandhu et al. and Heinrich patents, however, the polymer produced is not PHBA end-capped, but rather has a random structure.

U.S. Pat. No. 3,836,491 to Taft and U.S. Pat. Nos. 4,343,839, 4,374,181, 4,365,039, and 4,374,167 to Blegen disclose compositions capable of being cured at room temperature with a tertiary amine comprising a phenolic terminated polyester component and a polyisocyanate curing agent. These systems are unstable at room temperature and must be stored in two separate packages which are mixed together immediately prior to application. Taft discloses numerous uncapped prepolymer components which can be reacted with a carboxyphenol (e.g., hydroxybenzoic acid) to give a wide variety of capped hydroxy containing polymers for subsequent reaction.

Taft and Blegen, however, relate to two package polyurethane systems whereby mixing and subsequent reaction of the polymer with a polyisocyanate in the presence of a tertiary amine (basic catalyst) results in a rapidly curable composition (few minutes) at room temperature. Coatings prepared according to this method do not exhibit improved characteristics achieved by baking to cure the coating. Furthermore, in order to avoid direct esterification of hydroxybenzoic acid, Taft resorts to a difficult transesterification of the methyl ester of hydroxybenzoic acid. In order to provide an acceptable conversion, a significant excess (ca. 2 fold) of methylsalicylate, a methyl ester of hydroxybenzoic acid, must therefore be used, requiring an additional vacuum stripping operation at 0.05 mm Hg with heating up to 385° F. to remove the excess methylsalicylate. Even then, about 25% of the methylsalicylate could not be removed. Thus, this makes the product and process disclosed in Taft commercially undesirable and noncompetitive.

U.S. Pat. No. 4,331,782 to Linden discloses a method for making a "phenol-functional polyester polymer". According to this patent, hydroxybenzoic acid is pre-reacted in a first stage with an epoxy compound such as Cardura E (glycidyl ester of neodecanoic acid) to produce an adduct as shown below:

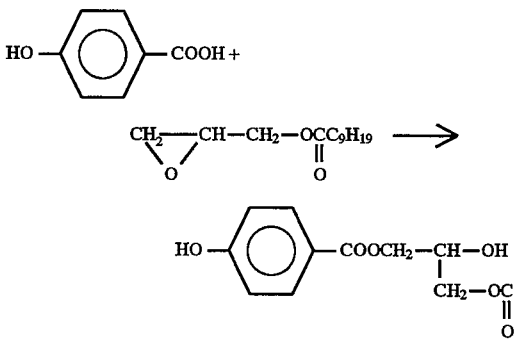

This step protects the carboxylic acid of the PHBA and prevents decarboxylation, and it also creates a more reactive hydroxyl site on the adduct so that subsequent reaction with other components is easier. In a second stage, the adduct is reacted with neopentyl glycol, adipic acid, and isophthalic acid to provide the phenol-functional polyester.

Linden teaches that direct reaction of hydroxybenzoic acid with a polyol for synthesis of a polyester is impractical since degradation of the hydroxybenzoic acid is prevalent. This patent further discloses that advantages achieved includes the ability to synthesize a phenol-functional polymer without subjecting hydroxybenzoic acid to conditions amenable to decarboxylation.

Linden also discloses a method whereby a polyester polymer is prepared which is substantially free of reactive aliphatic hydroxyl groups in order to provide increased pot life of a coating composition prepared therefrom. Reactive aliphatic hydroxyl groups, however, are desirable and even critical in some situations.

U.S. Pat. Nos. 4,267,239 and 4,298,658 to Thankachan et al. disclose alkyd resins containing free hydroxyl groups modified by reaction with FHBA. The modified alkyds are cured via a vapor curing process at room temperature with a di- or polyisocyanate in the presence of an amine vapor. These are also two package systems which must be stored separately. Coatings prepared according to this method, have limited properties because they are not formulated with an amino crosslinking agent and baked at elevated temperature.

Japanese Patent Nos. 52-73929, 52-81342, and 53-42338 relate to powder coating compositions comprising an amino resin and a polyester resin having phenolic hydroxyl groups and having a softening temperature of 40° to 150° C. Japanese Patent Nos. 52-81341 and 53-42341 are similar, but they also incorporate double bonds in the polyester structure to allow a second mode (oxidative) of crosslinking to take place in order to reduce the amount of crosslinking required by the amino crosslinking resin, and, consequently, reduce the amount of amino resin required. However, all of these patents are directed to powder coatings which require that the resin system be a solid under application conditions. Hence, they must have a high softening temperature which equates to a high Tg for the polyester resin. Furthermore, powder coatings are a specialized application technique and are not used extensively. More common application techniques require liquid systems.

SUMMARY OF THE INVENTION

The present invention is directed to liquid polymer and liquid polyol compositions for improved coatings with enhanced properties. These coatings provide simultaneous high hardness and high impact resistance, good weatherability, good corrosion resistance and hydrolytic stability, solvent resistance, adhesion, low color, and low impurity levels. These properties are produced without incorporation of L.C. polymers or mesogenic groups, thus avoiding the many drawbacks of L.C. polymers. For example, the present invention provides polymers without expensive mesogenic groups, saving on cost. Secondly, the present invention provides an improved, inexpensive, easier method of synthesis, which results in very substantially improved color of the polymer. This is important from a commercial standpoint, since it allows formulation of light colored and white coatings, an important marketing consideration. In addition, this improved synthetic procedure avoids another pitfall of some of the L.C. polyester based polymers, i.e., decomposition of the polyester portion of the polymer, resulting in extensive formation of phthalic anhydride. This phthalic anhydride remains in the L.C. polymeric mixture and provides a source of easily volatilized material which can have a deleterious effect in the application and curing of the coating.

In addition, unlike conventional two package polyurethane coatings systems which require separate storage of the individual packages followed by premixing of the two packages immediately prior to application, the liquid polymer and polyol compositions of this invention exhibit an almost infinite shelf life in the completely mixed state and can be applied as a homogeneous mixture which can then be cured to prepare a crosslinked polymer with outstanding properties.

The present invention is also directed to a method of preparing an hydroxybenzoic acid-capped polymer or polyol whereby extensive decarboxylation of the hydroxybenzoic acid starting material is avoided.

These and other objectives are achieved by providing a liquid polymer composition comprising a non liquid-crystalline esterphenol-capped polymer and an amino crosslinking agent, in addition to a solid, crosslinked polymer composition prepared by curing this polymer. Also provided is a liquid polyol composition comprising a non liquid-crystalline, esterphenol-capped polyhydric alcohol and the amino crosslinking agent. A method of improving the properties of a conventional film or surface coating prepared by curing a liquid film-forming or coating formulation is provided whereby the esterphenol-capped polymer or esterphenol-capped polyhydric alcohol is substituted for all or part of a conventional aliphatic hydroxy- or epoxyfunctional polymer or polyhydric alcohol, respectively, in the film-forming or coating formulation before cure.

An hydroxybenzoic acid-capped polymer or polyhydric alcohol is prepared by directly esterifying an aliphatic hydroxyfunctional polymer or polyhydric alcohol with hydroxybenzoic acid at a reaction temperature below 200° C. In another embodiment, the hydroxybenzoic acid-capped polymer is prepared by reacting a molar excess of an aliphatic hydroxy functional polymer or polyhydric alcohol with hydroxybenzoic acid at a reaction temperature below 200° C. to partially esterify the polymer or polyhydric alcohol. The reaction mixture is then reacted with polybasic acid or acid derivative below 200° C. until the desired level of conversion of carboxyl group to ester is achieved.

Another embodiment of the invention is carried out by charging all reactants simultaneously (polyhydric alcohols, polybasic acids, hydroxybenzoic acid) followed by esterification of the reaction mixture at a temperature below 200° C. until essential conversion of carboxyl groups into ester groups is achieved.

In a further aspect of this invention, the improved liquid polymeric and polyol compositions are converted to formulated coatings by addition of solvent, catalyst, and additives.

The liquid polymer and polyol compositions of this invention are useful for preparing surface coatings, films, adhesives, and in any other applications requiring similar properties.

DETAILED DESCRIPTION OF THE PREFERRED EMBODIMENTS

According to the invention, liquid polymeric vehicles or liquid polyol vehicles for improved coatings compositions which result in applied films with enhanced properties are provided in addition to methods for their preparation. The improved liquid polymeric vehicle may comprise (a) an esterphenol-capped polymer (oligomer), and (b) an amino crosslinking agent and, optionally, (c) an organic solvent. The improved liquid polyol vehicles may comprise (d) an esterphenol-capped medium molecular weight polyol, such as a $C_{12}$-$C_{40}$ polyhydric alcohol, and (b) an amino crosslinking agent, and, optionally, (c) an organic solvent. The improved liquid polymeric vehicle or liquid polyol vehicle contains no liquid-crystalline polymers or mesogenic groups. The liquid vehicle is converted into a formulated coating by adding the usual solvents, pigments, and additives such as flow modifiers and stabilizers which are employed in coating compositions. The formulated coating is applied to a substrate in the usual manner, e.g., by brushing, spraying, roller coating, or dipping. Then the coated substrate is baked to form the final film by simultaneously evaporating off the solvent and crosslinking mixture (a) or (d) with the amino crosslinking resin. The films of the invention are characterized by improved properties such as simultaneous high hardness and high impact resistance, good weatherability, good corrosion resistance and hydrolytic stability, solvent resistance, low color, low impurity levels, and good adhesion when compared with films made with similar (molecular weight, functionality, etc.) polymeric vehicles with no esterphenol groups.

For the purpose of describing this invention, the following terms are defined:

by the term "liquid" polymer composition is meant a polymer composition which is liquid at room temperature;

by the term "non liquid-crystalline" polymer is meant a polymer characterized by a lack of a detectable amount of liquid crystals as measured by X-ray diffraction techniques and/or optical polarizing microscopy techniques described by Dimian, A. F., Jones, F. N., J. Polym. Mater. Sci. Eng. 1987, 56; by the term "derived from" (as in a "monovalent radical derived from a polymer" or a "polyvalent radical derived from a polymer") is meant a monovalent or polyvalent radical created from (1) removal of at least one hydroxyl group from either a polyester, alkyd, or acrylic polymer, or (2) rearrangement of at least one epoxy group from an epoxide polymer (for example, if the polymer were a hydroxy-terminated polyester with two or more aliphatic hydroxyl groups, then the monovalent radical derived from such a polymer would be a monovalent radical created by removing one of the hydroxyl groups and the polyvalent radical derived from such a polymer would be a di(poly)valent radical created by removing two or more of the hydroxyl groups; if the polymer were an epoxide with two or more epoxy groups, then the monovalent radical derived from such epoxide polymer would be the primary monovalent radical created by rearrangement of one of the epoxy groups to yield a beta-hydroxy substituted radical site and the polyvalent radical would be the primary di(poly)valent radical created by rearrangement of two or more of the epoxy groups to yield beta-hydroxy substituted radical sites); this term is not meant to imply that the monovalent or polyvalent radical is necessarily prepared from that polymeric precursor;

by the term "hydrocarbylene" is meant a divalent hydrocarbon radical;

by the term "oxyhydrocarbylene" is meant a divalent hydrocarbon radical with oxygen-bearing groups, for example, carbonyl, ester, ether, hydroxyl, or phenolic groups; and by the term "acid derivative" is meant a derivative of an acid capable of undergoing substantially similar chemical reactions as that of the acid, for example, esterification (such derivatives include but are not limited to acid halides, esters and acid anhydrides).

The non liquid-crystalline esterphenol-capped polymer of component (a) of the improved liquid polymeric vehicle is depicted in formula (I) below:

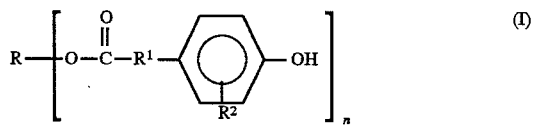

wherein

R=a polyvalent radical with a number average molecular weight between about 200–10,000 derived from a polymer having at least 2 aliphatic hydroxy- or epoxy-functional groups;

$R^1$=a direct bond, $C_{1-20}$ hydrocarbylene or $C_{1-20}$ oxyhydrocarbylene ($R^1$ preferably=a direct bond);

$R^2$=OH, H, halo, $C_{1-4}$ alkyl, $C_{1-4}$ alkoxycarbonyl, or $C_{1-4}$ alkoxy ($R^2$ preferably=H);

n is an integer between 2–10 inclusive (preferably n is an integer between 2–6 inclusive, most preferably 2–4 inclusive, and most preferably 2).

This radical R is a di- or polyvalent hydrocarbon (aromatic, aliphatic, or mixture thereof) radical which can optionally contain ester, hydroxy, epoxy, or ether linkages. Its number average molecular weight is in the range of about 200–10,000, preferably about 200–6000. In one embodiment R can be derived from a di- or polyhydroxy oligomeric precursor which is used to synthesize the esterphenol-capped polymers, via, among other routes, an esterification reaction. The preferred examples of these oligomeric precursors are di(poly)hydroxy polyesters, alkyds or acrylics. In another embodiment, R can be derived from a di- or poly-epoxide compound, which can be used to synthesize the esterphenol-capped polymers via, among other routes, reaction with the carboxyl group of the capping compound to yield hydroxy substituted esterphenol-capped polymers. Alternatively, precursors having the following structural functional groups can be employed to prepare liquid polymeric vehicles:

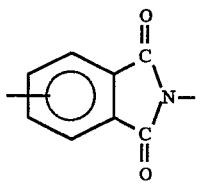

Imide Groups

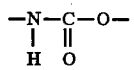

Amide Groups

Urethane Group wherein Q=H, or alkyl.

Preferably, the non liquid-crystalline, esterphenol capped polymer of component (a) of the improved liquid polymeric vehicle has the following formula:

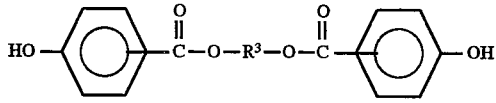

wherein:
$R^3$ is a divalent radical having a molecular weight between about 200 and 10,000, and is derived from a hydroxy-terminated polyester. The polyester is preferably prepared from one or more polyhydric alcohols and one or more polybasic acids or derivatives thereof.

In another embodiment of this invention, the backbone radical, R, can be derived from a simple medium molecular weight molecule, such as a $C_{12-40}$ polyhydric alcohol which can be capped with an esterphenol. In such a case, the liquid polymer composition would be more properly defined as a liquid polyol composition. However, for the sake of brevity, the terms "liquid polymeric vehicle", "liquid polymer composition" and "liquid polyol composition" are often used interchangeably throughout the specification, and the preferred embodiments for the liquid polymeric vehicle apply equally for the liquid polyol compositions. Preferably, the liquid polyol composition has the formula:

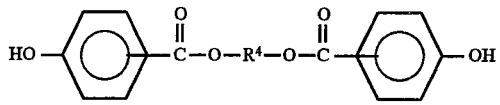

wherein $R^4$ is a divalent radical derived from a $C_{12-40}$ diol.

The following generally represents the esterphenol capping groups:

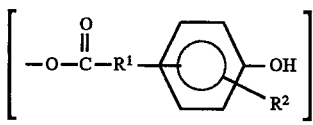

$R^1$ in the formula serves to connect the phenol group to the ester group and can be a direct bond, oxygen or a bivalent aliphatic or aromatic radical which may contain, optionally, a carbonyl or a phenol group. When $R^1$ is a bivalent radical, it can contain 1–20, preferably 1–11, and more preferably 1–7 carbon atoms. $R^2$ is as defined above.

Examples of compounds from which the esterphenol capping groups are derived are:

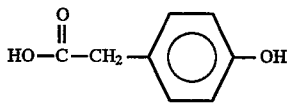

Hydroxyphenylacetic acid

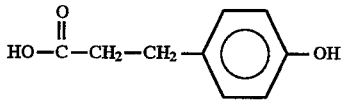

Hydroxyphenylpropionic acid

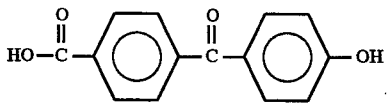

Hydroxycarboxybenzophenone

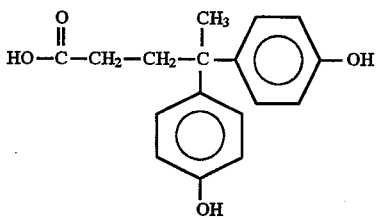

4,4-bishydroxylphenylpentanoic acid.

When $R^1$ is a direct bond, the formula reduces to hydroxybenzoic acid and it can be ortho-, meta-, or para-. A preferred embodiment is the para-hydroxybenzoic acid (PHBA).

The non liquid-crystalline esterphenol-capped polymer (I) of component (a) of the improved liquid polymeric vehicle can be essentially a pure compound, or it can be used in admixture with other compounds. In one embodiment, (I) can be used in a mixture of similar, but different, compounds created by blending mixtures produced from different starting materials. In a preferred embodiment, (I) is used in admixture with the starting material from which it was made, and intermediate compounds in the preparation. In this embodiment the esterphenol-capped polymers are prepared in sequential steps from a polymeric di(poly)ol (polyester, alkyd, or acrylic) or a polymeric di(poly)epoxide precursor. The precursor is reacted with the capping group in sequential steps. The first step forms the mono-substituted derivative (II) with the esterphenol-capping group on only one site of the polymer. Then the next step forms the derivative with the esterphenol group on two sites of the polymer. Further reaction at additional sites of the polymer is possible but not necessary to accomplish the objectives of the present invention. The sequential reaction proceeds as follows:

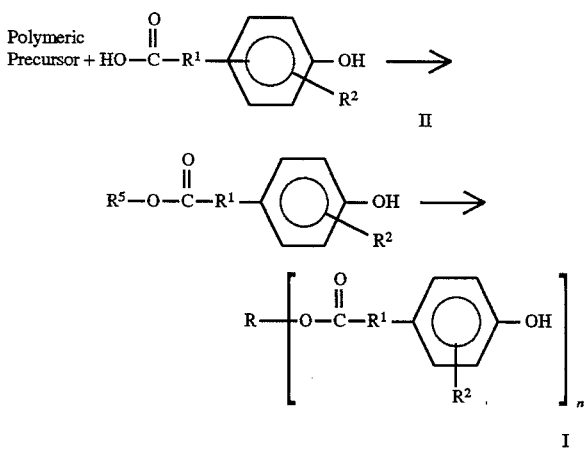

wherein

R=a polyvalent radical with a number average molecular weight between about 200–10,000 derived from a polymer having at least 2 aliphatic hydroxy- or epoxy-functional groups;

$R^1$=a direct bond, $C_{1-20}$ hydrocarbylene or $C_{1-20}$ oxyhydrocarbylene ($R^1$ preferably=a direct bond):

$R^2$=OH, H, halo, $C_{1-4}$ alkyl, $C_{1-4}$ alkoxycarbonyl, or $C_{1-4}$ alkoxy ($R^2$ preferably=H);

$R^5$=a monovalent radical with a number average molecular weight between about 200–10,000 derived from the polymer having at least 2 aliphatic hydroxy- or epoxy-functional groups:

n is an integer between 2–10 inclusive (preferably n is an integer between 2–6 inclusive, most preferably 2–4 inclusive, and most preferably 2);

In one embodiment, the oligomeric precursor which can be used to synthesize the esterphenol-capped polymer is a low molecular weight polyesterdiol. It can be formed by the condensation reaction of a di- or polyol with a di- or polyacid. The polyol generally contains 2 to about 8 carbon atoms, preferably about 2 to 6 carbon atoms, in addition to having 2 to about 6, preferably 2 to about 4, hydroxyl groups. Some preferred examples of the polyols are one or more of the following: neopentyl glycol; ethylene glycol; propylene glycol; butanediol; hexamethylenediol; 1,2-cyclohexanedimethanol; 1,3-cyclohexanedimethanol; 1,4-cyclohexanedimethanol; trimethylol propane; pentaerythritol; diethylene glycol; triethylene glycol; tetraethylene glycol; dipropylene glycol; polypropylene glycol; hexylene glycol; 2-methyl-2-ethyl-1,3-propanediol; 2-ethyl-1,3-hexanediol; 1,5-pentanediol; thiodiglycol; 1,3-propanediol; 1,3-butanediol; 2,3-butanediol; 1,4-butanediol; 2,2,4-trimethyl-1,3-pentanediol; 1,2-cyclohexanediol; 1,3-cyclohexanediol; 1,4-cyclohexanediol; glycerol; trimethylolpropane; trimethylolethane; 1,2,4-butanetriol; 1,2,6-hexanetriol; dipentaerythritol; tripentaerythritol; mannitol; sorbitol; methylglycoside; like compounds apparent to those skilled in the art; and mixtures thereof. The polyacids contain about 2 to 34 carbon atoms in aliphatic or aromatic moieties, and at least 2, preferably no more than 4, carboxyl groups which may, alternatively, be present in the form of anhydride groups. The polyacids are preferably one or more of the following: phthalic anhydride, terephthalic acid, isophthalic acid, adipic acid, succinic acid, glutaric acid, fumaric acid, maleic acid, cyclohexane dicarboxylic acid, trimellitic anhydride, azeleic acid, sebasic acid, dimer acid, pyromellitic dianhydride, substituted maleic and fumaric acids such as citraconic, chloromaleic, mesaconic, and substituted succinic acids such as aconitic and itaconic. Mixtures of polyols or polyacids or both can be employed.

In a preferred embodiment, a polyester diol (II) is reacted with PHBA to form an esterphenol-capped polymer in a stepwise fashion as follows:

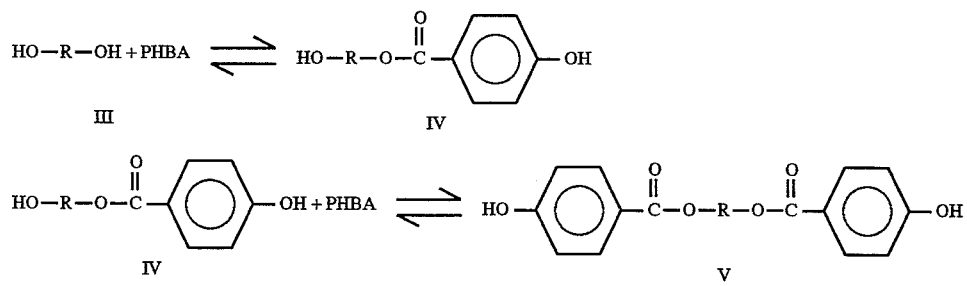

In the first step, PHBA is reacted with one end of the polyesterdiol to give a polymer which has one aliphatic hydroxy group and one esterphenol group (IV). In the second step, a second PHBA reacts with IV to produce the esterphenol-capped polymer (V). The reaction product distribution is governed by the amount of PHBA used. With use of a stoichiometric amount of PHBA the reaction can be made to produce almost exclusively V, or, if less PHBA is used, it can be stopped short to give a mixture of III, IV, and V. This mixture constitutes one of the preferred species of the present invention. Depending on the level of PHBA used, the relative amounts of III, IV, and V can be varied. With low PHBA, III will predominate, with some IV, and very little V. At higher PHBA levels, IV increases at the expense of III, and V starts to increase. At still higher PHBA levels, IV and V become the major species with small amounts of III. Finally, at very high PHBA levels, V almost becomes the exclusive product.

In an alternate embodiment, the reaction can be carried to high conversion of the diol by using high levels of PHBA, giving a product with predominantly V, and with only small amounts of III and IV. Then, in order to produce one of the preferred species, this product can be blended with some additional unreacted starting material III. The resulting blend would be predominantly V and III with very little IV.

In another embodiment, the di- or polyhydroxy oligomeric precursor used to synthesize the esterphenol-capped polymer is an alkyd resin. An alkyd resin is an oil modified polyester resin and broadly is the product of the reaction of a di- or polyhydric alcohol and a di- or poly- basic acid or acid derivative and an oil, fat or carboxylic acid derived from such oil or fat which acts as a modifier. Such modifiers are typically drying oils. The dihydric or polyhydric alcohol employed in the first stage is suitably an aliphatic alcohol; suitable alcohols include glycol, 1,2- or 1,3-propylene glycol, butanediol, hexanediol, neopentyl glycol, glycerol, trimethylolethane, trimethylolpropane and pentaerythritol. Mixtures of the alcohols may also be employed, particularly to provide a desired content of hydroxyl groups. When pentaerythritol is employed alone as the alcohol component there is some tendency for crosslinking between hydroxyl groups and this produces a more brittle coating. The dibasic or polybasic acid, or corresponding anhydrides may be selected from a variety of aliphatic and aromatic carboxylic acids. Suitable acids and acid anhydrides include, by way of example, succinic acid, adipic acid, phthalic anhydride, isophthalic acid, trimellitic anhydride and bis 3,3',4,4'-benzophenone tetracarboxylic anhydride. Mixtures of these acids and anhydrides may be employed to produce a balance of properties. As the drying oil or fatty acid there is suitably employed a saturated or unsaturated fatty acid of 12 to 22 carbon atoms or a corresponding triglyceride, that is a corresponding fat or oil, such as those contained in animal or vegetable fats or oils. Suitable fats and oils include tall oil, castor oil, coconut oil, lard, linseed oil, palm oil, peanut oil, rapeseed oil, soybean oil and beef tallow. Such fats and oils comprise mixed triglycerides of such fatty acids as caprylic, capric, lauric, myristic, palmitic and stearic and such unsaturated fatty acids as oleic, eracic, ricinoleic, linoleic and linolenic. Chemically these fats and oils are usually mixtures of two or more members of the class.

As indicated above, the number average molecular weight of polymeric precursor radical R, divalent radical $R^3$ or monovalent radical $R^5$ generally ranges from about 200 to about 10,000. In certain applications requiring more flexible coatings such as coil coating, it is preferred that the molecular weight of these radicals be on the high side of this range, i.e., at least about 3,000 and more preferably from about 3,000 to about 6,000. In most other applications where coatings having higher hardness are desired, it is preferred that the molecular weight of these radicals be on the low side of this range, i.e., less than about 3,000 and more preferably within the range of from about 200 to about 1500.

If the oligomeric precursor from which the backbone radical, R, is derived is a polyester or an alkyd resin, then the number average molecular weight is preferably between the 200 to 6,000 range set forth above.

In still another embodiment, the di- or polyhydroxy oligomeric precursor used to synthesize the esterphenol capped polymer is an acrylic copolymer resin. The acrylic copolymer resin is prepared from at least one hydroxy-substituted alkyl (meth)acrylate and at least one non-hydroxy-substituted alkyl (meth)acrylate. The hydroxy-substituted alkyl (meth)acrylates which can be employed as monomers comprise members selected from the group consisting of the following esters of acrylic or methacrylic acid and aliphatic glycols; 2-hydroxyethyl acrylate, 3-chloro-2ohydroxypropyl acrylate; 1-hydroxy-2-acryloxy propane; 2-hydroxypropyl acrylate; 3-hydroxypropylacrylate; 2,3-dihydroxypropylacrylate; 3-hydroxbutyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 1-hydroxy-2-methacryloxy propane; 2-hydroxypropyl methacrylate; 2,3-dihydroxypropyl methacrylate; 2-hydroxybutyl methacrylate; 3-hydroxybutyl methacrylate; 2-hydroxyethyl methacrylate; 4-hydroxybutylmethacrylate; 3,4-dihydroxybutyl methacrylate: 5-hydroxypentyl methacrylate; and 7-hydroxyheptyl methacrylate. Although one of ordinary skill in the art will recognize that many different hydroxy-substituted alkyl (meth)acrylates including those listed above could be employed, the preferred hydroxy functional monomers for use in the resins of this invention are hydroxy-substituted alkyl (meth)acrylates having a total of 5 to 7 carbon atoms, i.e., esters of $C_2$ to $C_3$ dihydric alcohols and acrylic or methacrylic acids. Illustrative of particularly suitable hydroxy- substituted alkyl (meth)acrylate monomers are 2-hydroxyethyl methacrylate, 2-hydroxyethyl acrylate, 2-hydroxybutyl acrylate, 2-hydroxypropyl methacrylate, and 2-hydroxypropyl acrylate.

Among the non-hydroxy-substituted alkyl (meth)acrylate monomers which may be employed are alkyl (meth) acrylates (as before, meaning esters of either acrylic or methacrylic acids). Preferred nonhydroxy unsaturated monomers are esters of $C_1$ to $C_{12}$ monohydric alcohols and acrylic or methacrylic acids, e.g., methyl methacrylate, hexyl acrylate, 2-ethylhexyl acrylate, lauryl methacrylate, glycidyl methacrylate, etc. Examples of particularly suitable monomers are butyl acrylate, butyl methacrylate and methyl methacrylate.

Additionally, the acrylic copolymer resin of the present invention may include in their composition other monomers such as acrylic acid and methacrylic acid, monovinyl aromatic hydrocarbons containing from 8 to 12 carbon atoms (including styrene, alpha-methyl styrene, vinyl toluene, t-butyl styrene, chlorostyrene and the like), vinyl chloride, vinylidene chloride, acrylonitrile, and methacrylonitrile).

The acrylic copolymer preferably has a number average molecular weight between about 1000 and 6000, more preferably between about 2000 and 5000.

In a further embodiment, an epoxy resin is used to synthesize the esterphenol-capped polymer. Epoxy resins of this invention are characterized by the presence of two or more three-membered cyclic ether groups (epoxy group or 1,2-epoxide) and can be considered as an anhydrous form of 1,2-diols. The synthesis of the esterphenol-capped polymers from epoxy resins is different from the simple esterification of polyols discussed above and is based on the reactions:

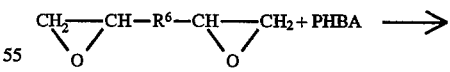

VI

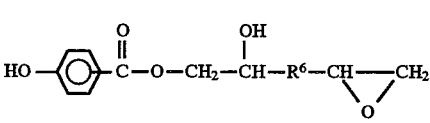

VII

-continued

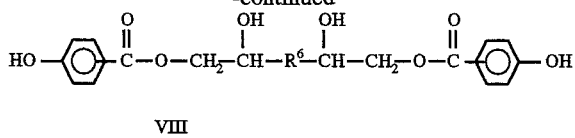

VIII

Compound VIII has four or more functional groups per molecule (depending on the structure of $R^6$). The most widely used epoxy resins are diglycidyl ethers of bisphenol A. Other diepoxy resins commercially produced are hydantoin based (Ciba Geigy Epoxy Resin 0163 is an example) and cycloaliphatic types (Union Carbide). The multiepoxy functionality is realized in epoxy phenol novalacs (DEN 431, DEN 438, DEN 439 of The Dow Chemical Company). The reaction of PHBA with epoxy resins proceeds at milder conditions (lower temperature, shorter time) then the esterification of di(poly)ols and reduces the danger of decomposition of PHBA. However, this chemistry can be applied only to bis- or poly-epoxy resins or compounds, and therefore limits possible structures of esterphenol-capped polymers to the corresponding epoxy resins.

The amino crosslinking agents used in the present invention are well known commercial products. They are organic compounds of the general structural type, as shown below:

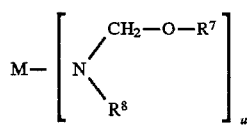

wherein:
$u \geq 2$;
$R^7$ = H, or $C_1$–$C_4$ alkyl; or $C_1$–$C_4$ alkyl
$R^8$ = H, —CH$_2$—OR$^5$, —CH$_2$—N—Q,
        CH$_2$OR$^5$ The amino crosslinking resins are produced by companies such as American Cyanamid, Monsanto, etc., and are made by the reaction of di(poly)amide(amine) compounds with formaldehyde and, optionally, lower alcohol.

The amino crosslinking resins that are currently produced commercially are based on:

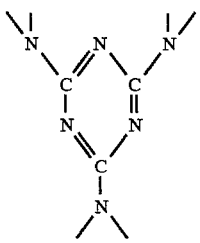

Melamine

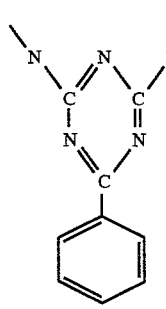

Benzoguanamine

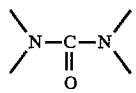

Urea

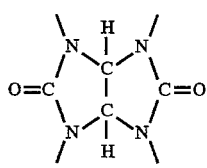

Glycoluryl

In the present invention, the ratio of the active crosslinking groups, i.e., methylol (alkoxymethyl) groups of the amino crosslinking agent to the phenol groups on the esterphenol-capped polymer or polyhydric alcohol is desirably from about 1.0:1.0 to 15.0:1.0, more preferably from about 1.0:1.0 to 5.0:1.0, most preferably from about 1.5:1.0 to 4.0:1.0.

On a weight basis, the amount of amino crosslinking agent effective for curing the crosslinkable binder generally ranges from about 3 to about 50 parts by weight, more preferably from about 10 to about 40 parts by weight based on the combined weight of the amino crosslinking agent, esterphenol-capped polymer and any other crosslinkable polymer constituent of the composition. In general, quantities of crosslinking agent required to cure the composition are inversely proportional to the number average molecular weight of the ester phenol-capped polymer composition. Quantities of crosslinking agent on the higher side of this range are required to properly cure ester phenol-capped polymer compositions having a relatively low number average molecular weight, e.g., from about 200 to about 3,000, whereas lesser amounts of the crosslinking agent are required to properly cure ester phenol-capped polymers having a higher number average molecular weight, e.g., from about 3,000 to about 10,000.

Examples of suitable amino-crosslinking resins for the liquid vehicle are:

Melamine Based

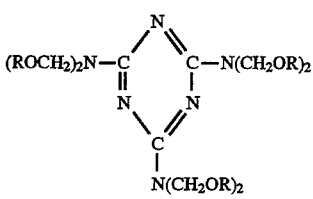

wherein R is the following:

R=CH$_3$ (Cymel™ 300, 301, 303);
R=CH$_3$, C$_2$H$_5$ (Cymel™ 1116);
R=CH$_3$, C$_4$H$_9$ (Cymel™ 1130, 1133);
R=C$_4$H$_9$ (Cymel™ 1156); or
R=CH$_3$, H (Cymel™ 370, 373, 380, 385)

The preferred melamine is hexamethoxymethylmelamine.

Benzoquanamine Based Resin

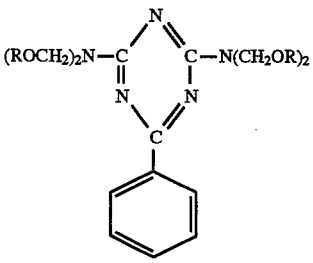

wherein R=CH$_3$, C$_2$H$_5$ (Cymel™ 1123)

Urea Based Resins

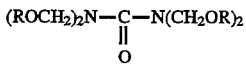

wherein
R=CH$_3$, H (Beetle 60, Beetle 65); or
R=C$_4$H$_9$ (Beetle 80).

Glycoluryl Based Resins

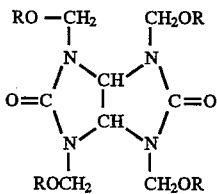

wherein:
R=CH$_3$, C$_2$H$_5$ (Cymel™ 1171); or
R=C$_4$H$_9$ (Cymel™ 1170).

The liquid polymeric vehicle may also include pigment. Preferably, the pigment is present in the vehicle in a weight ratio of the pigment to the esterphenol-capped polymer plus amino crosslinking agent in a range of about 0.5:1.0 to 2.0:1.0, more preferably 0.8:1.0 to 1.1:1.0.

The present invention produces an improved polymeric vehicle which yields films with enhanced properties such as simultaneous high hardness and high impact values. High impact values reflect a high degree of flexibility, and high flexibility is dependent upon the Tg value of component (a).

In order to impart high flexibility, the Tg of component (a) should be less than about 40, preferably between about −40° and 40° C., more preferably between about −30° and 35° C., and most preferably between −20° and 30° C. If component (a) is a mixture, then the Tg of the mixture can be measured by conventional means, or it can be calculated from the following equation:

$$\frac{1}{Tg} = \frac{W_I}{Tg_I} + \frac{W_{II}}{Tg_{II}} + \frac{W_{III}}{Tg_{III}}$$

where $W_I$, $W_{II}$ and $W_{III}$ are weight fractions of component structures I, II and III and $Tg_I$, $Tg_{II}$ and $Tg_{III}$ are the corresponding Tg.

Conventional coating systems require an acidic catalyst for curing with amino crosslinking resins. In the present invention, however, there is an alternate curing scheme which can be used and surprisingly, an acidic catalyst is not required. In fact, no catalyst is required. The desired crosslinking reaction can be obtained by just heating the liquid polymeric vehicle. The time and temperature depend on the specific reaction system, but the conditions are generally similar to those employed with an acidic catalyst. In another surprising feature of the invention, it has been found beneficial to use a basic catalyst with the present invention. A suitable base is the alkaline or alkaline earth metal salt of a weak organic acid, such as potassium neodecanoate. This catalyst can be used in the same quantities as the strong acid catalyst, and the baking schedules are similar.

Another aspect of the present invention involves preparation of the esterphenol-capped oligomers. There are several problems with conventional approaches discussed in the literature. It has been shown repeatedly in the prior art that direct esterification of a polyol with hydroxybenzoic acid is accompanied by large amounts of decarboxylation of the hydroxybenzoic acid to yield phenol and carbon dioxide. Indeed, U.S. Pat. No. 4,331,782 to Linden teaches that the direct reaction of hydroxybenzoic acid with a polyol for the synthesis of a polyester is impractical since degradation of the hydroxybenzoic acid is prevalent. Thus, extensive decarboxylation renders the method impractical since large amounts of expensive hydroxybenzoic acid are destroyed. Other problems for the direct esterification are also important drawbacks for this method. Jones (European Patent Application No. 0 287 233 filed Mar. 28, 1988, and published Oct. 19, 1988) teaches a method for direct esterification of an oligomer (composed of phthalic acid, adipic acid, and neopentyl glycol) with PHBA using a p-TSA catalyst and a high boiling aromatic solvent. This method, however, gives a very highly colored product which is also characterized by high level of decomposition of the oligomer to form phthalic anhydride. It would be very difficult to use this product for the preparation of a low color or white paint. The high levels of phthalic anhydride would also present difficulties with certain methods of paint application, and it would further present a problem with increased levels of volatile emissions. In the present invention methods to overcome all of these problems have been found, permitting direct esterification to be used as a method of choice.

In the present invention, two methods are used separately or in conjunction to minimize or eliminate the aforementioned problems, e.g., (1) proper control of the reaction conditions, i.e., minimizing exposure of hydroxybenzoic acid to high temperatures, and (2) use of hydroxybenzoic acid containing no or only very low levels of basic impurities.

In one embodiment, a two stage reaction is used. In the first stage, the hydroxybenzoic acid is mixed with a molar excess of a $C_{2-8}$ polyhydric alcohol, such as neopentyl glycol. Preferably, the ratio of $C_{2-8}$ polyhydric alcohol to the hydroxy benzoic acid ranges from about 1:1 to 10:1. A suitable solvent and, optionally, a catalyst may be added and the solution is stirred and heated from 140°–200° C. The excess amount of neopentyl glycol, which will be subsequently reacted, helps to drive the reaction by a mass action effect, resulting in a faster reaction rate which allows a lower reaction temperature to be used. After most of the water of reaction has been removed, the other monomers, e.g., polybasic acids or derivatives thereof, are added and the second stage of the reaction is also carried out at temperatures between 140°–200° C. This technique keeps the temperature below 200° C. and minimizes decarboxylation of the hydroxybenzoic acid. The reaction can be completed by increasing the reaction temperature, preferably between about 200° and 230° C., to esterify residual reactants.

In another embodiment, a single stage reaction is utilized. All of the reactants, a catalyst (optional), and a solvent may be combined and heated at a temperature between 140°–200° C. It is important to maintain the temperature at this level until at least about 5%, more preferably 70%, and more preferably at least about 80%, of the esterification reaction has taken place. The water of reaction is used to monitor progress of the reaction. At that time, the temperature can be raised up to for instance about 230° C. to complete the reaction.

In a third embodiment, the aliphatic hydroxy-functional polymer can be prepared conventionally in the absence of hydroxybenzoic acid. This polymer or a $C_{12-40}$ polyhydric alcohol can then be added to the hydroxybenzoic acid and reacted at 140°–200° C. until at least 5%, more preferably 70%, more preferably at least 80%, conversion has been attained. The temperature is then raised to about 230° C. to complete the reaction. This approach can be beneficial in some cases allowing synthesis of esterphenol-capped polymers or polyols with narrow molecular weight distribution.

Generally, greater than 5 weight percent of the aliphatic hydroxy-functional polymer or $C_{12-40}$ polyhydric alcohol is esterified to form the hydroxybenzoic acid-capped polymer or polyol. Moreover, the amount of hydroxybenzoic acid used to esterify the aliphatic hydroxy-functional polymer or $C_{12-40}$ polyhydric alcohol ranges from about 0.05 to 1.25 equivalents of hydroxybenzoic acid to 1.0 equivalents of polymer or alcohol, preferably 0.25 to 1.0 equivalents of hydroxybenzoic acid to 1.0 equivalents of polymer or alcohol.

The reaction can be performed either with or without catalyst. While the reaction can be made to proceed to completion and form a good quality esterphenol-capped oligomer without a catalyst, the addition of proper catalysts can be beneficial in accelerating the reaction. Suitable catalysts for the reaction include numerous oxides, salts, and alcoholates of Group II to V metals, like Zn, Sn, Al, Mn, and Ti which are known as esterification and trans-esterification catalysts. Other catalysts include such metalloid compounds as $B_2O_3$, $H_3BO_3$, $Sb_2O_3$, $As_2O_3$, etc. The catalyst employed can also be a weak acid such as phosphorous acid, phosphoric acid, or hypophosphorous acid, or a strong acid catalyst such as p-toluene sulfonic acid and methane sulfonic acid. These catalysts can be used in quantities ranging from about 0.01 wt. % to about 2.0 wt. %.

In some cases, no solvent is required during the synthesis of the esterphenol-capped liquid polymer or polyol. In other cases, one or more solvents can be used to dissolve the reactants. If a solvent is used, it should be inert during the esterification reaction. Hydrocarbon solvents are preferable and aromatic hydrocarbon solvents are most preferable.

Water off-take is used to monitor the reaction and to determine the appropriate time to terminate the reaction which can vary from about 4 hours to about 30 hours, more preferably from 6 to 20 hours. The relative amounts of compounds I and II, and III are determined by the stoichiometry, or the amounts of hydroxybenzoic acid used.

It has been found that minimizing hydroxybenzoic acid decarboxylation can also be achieved by minimizing or eliminating certain impurities which catalyze the decarboxylation. Such impurities are basic compounds, particularly alkaline or alkaline earth metal salts of weak acids. The most prevalent of these basic impurities is the potassium salt of PHBA and/or potassium phenolate, which are frequently present as impurities in commercial PHBA. The potassium salt presence arises from incomplete neutralization of the potassium para-hydroxybenzoate or potassium phenoxide, which are intermediates in the manufacture of PHBA. Other basic compounds, which react with PHBA to give the PHBA anion also accelerate decarboxylation. To this end it has been found that to avoid decarboxylation high purity PHBA with very low levels of a base such as the potassium salt should be used. Another way to avoid the decarboxylation is to neutralize the basic impurities with the acid which is used to catalyze the esterification process. In the latter approach, care must be taken to avoid an excess of the acidic catalyst, since the excess would tend to be harmful to the properties of the baked film. Preferably, the esterification reaction mixture contains no greater than 0.2%, more preferably no greater than 0.01%, and more preferably no greater than 0.0001% of basic impurities, particularly alkaline or alkaline earth metal salts of weak acids such as the potassium salt of PHBA or potassium phenolate.

The present invention deals with the novel coating vehicle formed by combining component (a), amino crosslinking agent, and (optionally) a solvent. Application of the formulated coating can be made via conventional methods such as spraying, roller coating, dip coating, etc., and then the coated system is cured by baking. The same or different solvent(s) which are optionally used during the synthesis of the esterphenol-capped polymeric or polyol vehicle to dissolve reactants may also be added during the formulation of the coating composition to adjust viscosity so as to provide a formulation with a viscosity usually between about 10 centipoise to 10 poise. One or more solvents can be used. In many cases, a single solvent is used to solubilize the system. However, in other cases it is often desirable to use mixtures of solvents in order to effect the best solubilization, and in particular a combination of aromatic solvents with oxygenated solvents. Suitable aromatic solvents include toluene, xylene, ethylbenzene, tetralin, naphthalene, and solvents which are narrow cut aromatic solvents comprising $C_8$ to $C_{13}$ aromatics such as those marketed by Exxon Company U.S.A. under the name Aromatic 100, Aromatic 150, and Aromatic 200. The oxygenated solvents should not be extremely polar such as to become incompatible with the aromatic solvents. Suitable oxygenated solvents include propylene glycol monomethyl ether acetate, propylene glycol propyl ether acetate, ethyl ethoxypropionate, dipropylene glycol monomethyl ether acetate, propylene glycol monomethyl ether, propylene glycol monopropyl ether, dipropylene glycol monomethyl ether, diethylene glycol monobutyl ether acetate, ethylene glycol monoethyl ether acetate, ethylene glycol monobutyl ether acetate, ethylene glycol monoethyl ether, ethylene glycol monobutyl ether, diethylene glycol monoethyl ether, diethylene glycol monoethyl ether acetate, Dibasic ester (a mixture of esters of dibasic acids marketed by DuPont), ethyl acetate, n-propyl acetate, isopropyl acetate, butyl acetate. isobutyl acetate, amyl acetate, isoamyl acetate, mixtures of hexyl acetates such as those sold by Exxon Chemical Company under the brand name Exxate® 600, mixtures of heptyl acetates such as those sold by Exxon Chemical Company under the brand name Exxate® 700, acetone, methyl ethyl ketone, methyl isobutyl ketone, methyl amyl ketone, methyl isoamyl ketone, methyl heptyl ketone, isophorone, isopropanol, n-butanol, sec.-butanol, isobutanol, amyl alcohol, isoamyl alcohol, hexanols, and heptanols. The list should not be considered as limiting, but rather as examples of solvents which are useful in the present invention. The type and concentration of solvents are generally selected to obtain formulation viscosities and evaporation rates suitable for the application and baking of the coatings. Typical solvent concentrations in the formulations range from 0 to about 75% by weight with a preferred range between about 5 and 50% and a most preferred range between about 10 and 40%. For the preparation of high solids coatings, the amount of solvent used in the coating formulation is preferably less than 40% of the weight of the formulation.

Satisfactory baking schedules for formulations of the present invention vary widely including, but not limited to, low temperature bakes of about 20 to 30 minutes at temperatures between 200° to 220° F. for large equipment applications and high temperature bakes of about 5 to 10 seconds in 600° to 700° F. air for coil coating applications. In general, the substrate and coating should be baked at a sufficiently high temperature for a sufficiently long time so that essentially all solvents are evaporated from the film and chemical reactions between the polymer and the crosslinking agent proceed to the desired degree of completion. The desired degree of completion also varies widely and depends on the particular combination of cured film properties required for a given application.

Required baking schedules also depend on the type and concentration of catalysts added to the formulations and on the thickness of the applied coating film. In general, thinner films and coatings with higher concentrations of catalyst cure more easily, i.e., at lower temperatures and/or shorter baking times.

Acid catalysts may be used to cure systems containing hexamethoxymethyl melamine and other amino crosslinking agents, and a variety of suitable acid catalysts are known to one skilled in the art for this purpose. These include, for example, p-toluene sulfonic acid, methane sulfonic acid, nonylbenzene sulfonic acid, dinonylnapthalene disulfonic acid, dodecylbenzene sulfonic acid, phosphoric acid, phenyl acid phosphate, butyl phosphate, butyl maleate, and the like or a compatible mixture of them. These acid catalysts may be used in their neat, unblocked form or combined with suitable blocking agents such as amines. Typical examples of unblocked catalysts are the King Industries, Inc. products with the tradename K-Cure(R). Examples of blocked catalysts are the King Industries, Inc. products with the tradename NACURE(R).

The amount of catalyst employed typically varies inversely with the severity of the baking schedule, In particular, smaller concentrations of catalyst are usually required for higher baking temperatures or longer baking times. Typical catalyst concentrations for moderate baking conditions (15 to 30 minutes at 275° F.) would be about 0.3 to 0.5 wt. % catalyst solids per polymer plus crosslinking agent solids. Higher concentrations of catalyst up to about 2 wt. % may be employed for cures at lower temperature or shorter times; cures at higher temperatures or longer times may not require an acid catalyst.

For formulations of this invention containing hexamethoxymethyl melamine as the crosslinking agent and p-toluene sulfonic acid as the catalyst, preferred curing conditions at dry film thickness of about t mil are catalyst concentration between about 0 and 0.6 wt. % (solids per polymer plus crosslinking agent solids), baking temperature between 250° and 400° F. and baking time between about 5 and 60 minutes. Most preferred curing conditions are catalyst concentration between about 0 and 0.3 wt. %, baking temperature between about 300° and 350° F. and baking time between about 20 and 40 minutes.

As described above, the liquid polymeric vehicles of the invention are characterized by improved weather resistance. However, additional improvements in this and other properties can be achieved by formulation with stabilizers and stabilizing systems. Among compounds providing improvements in weather resistance are HALS (hindered amine light stabilizers), UV-screeners, antioxidants, etc. To achieve the desired color, the liquid polymeric vehicle can be formulated with various pigments. If pigment is added to the coating formulation, then the ratio of pigment to esterphenol-capped polymer or polyol and amino crosslinking agent desirably ranges from about 0.5:1.0 to 2.0:1.0, preferably from about 0.8:1.0 to 1.1:1.0. Another formulating tool to improve weather resistance are silicone resins used to replace part of basic polymer material and impart better weather resistance to the whole system. All of these formulating approaches can be used with the liquid polymeric vehicles of the present invention.

The following examples illustrate but are not intended to limit the scope of this invention.

EXAMPLES

The following example shows the preparation of a polyesterdiol in a typical process.

EXAMPLE 1

Into a 2-1 four-necked flask equipped with a mechanical stirrer, heating mantle, nitrogen sparger, 10 inch column packed with glass beads on top of which is a Dean Stark trap and chilled water condenser, and thermometer fitted with temperature controller, are charged 222 g. phthalic anhydride (PA), 219 g. adipic acid (AA), 468 g. neopentyl glycol (NPG), and 200 g. Aromatic 150 solvent (a narrow-cut solvent of $C_9$-$C_{12}$ aromatics marketed by Exxon Company USA). The contents are heated to melting, stirred, and heating is continued to about 160° C. where the solvent/water azeotrope starts to distill out. The solvent is continuously removed from the Dean Stark trap and returned to the flask. Water removal is used to monitor the reaction. Heating is continued and the temperature allowed to rise as the water is removed to a final temperature of 207° C. The reaction is stopped after the theoretical amount of water has been removed, which takes 8 hours. The product is cooled and discharged. The product has an NVM (nonvolatile matter) =84.1%, acid number 5.8, hydroxyl number 168, and a reduced viscosity of 0.058 for a 10% solution in glacial acetic acid. This polyester diol can be abbreviated as follows: NPG/AA/PA:3/1/1.

Other similar polyester diols are prepared in this manner by simply substituting different monomers, monomer ratios, and solvents.

The following example shows that the preparation of an esterphenol-capped polyester (PHBA/NPG/AA/PA) in accordance with EPA 0287233 using an excess of PHBA at an elevated temperature (ca. 230° C.) with a strong acid catalyst results in a highly colored product with a large amount of phthalic anhydride formed during the second step by decomposition of the polyester diol backbone.

EXAMPLE 2

Phthalic anhydride (740 g., 5.0 mole), adipic acid (730 g., 5.0 mole), neopentyl glycol (1560 g., 15.0 mole), and xylene (130 g.) are charged to a 5-liter, 4-necked flask equipped with a thermometer, heating mantle, stirrer driven by an air motor, and a Dean Stark trap. A water condenser is attached to the top of the Dean Stark trap to provide reflux. The reactor system is sparged with a light stream of nitrogen (40 cc/min). The solids are heated and stirring is initiated when the solids begin to melt. Water formation begins when the reactor temperature is 150° C. The temperature slowly rises to 230° C. over a period of 7 hours. Analysis of the aqueous overhead by gas chromatography indicates that neopentyl glycol codistills with water at these conditions. The reaction mixture is refluxed an additional 6 hours at 230° C. and then stripped of solvent. The non volatile material (NVM) of the product is ~97% (1 hr. at 150° C.). The acid number is 1.4 mg KOH/g. Analysis of the aqueous overhead indicates that 168 g. of neopentyl glycol is lost due to distillation. The oligoester diol has a final overall composition of NPG/AA/PA equal to 2.68/1/1. The total yield is 3141 g. Only a trace of residual PA is present, as shown by I.R. and the low acid number.

Part of the above oligoester diol (2293 g.) is recharged to the same apparatus along with PHBA (1537 g.), p-TSA (7.6 g.), and Aromatic 150 (364 g.). The effluent gas is passed through a small column containing Drienete (water trap) and subsequently through a column packed with Ascarite ($CO_2$ trap). The slurry is heated with stirring. Water formation occurs at ~190° C. The temperature slowly rises to 230° C. over a period of 9 hours. The reaction mixture is maintained at 230° C. for an additional 9 hours to complete the esterification. The yield is 3979 g. The non volatile material (1 hours at 150° C.) is 82%. Gardner color of the product is 14. An intrared spectrum indicates the presence of 14% (weight) phthalic anhydride dissolved in the product. $^{13}C$ NMR confirms the level of phthalic anhydride in the product. Approximately 0.2% of the charged PHBA undergoes decarboxylation during the reaction (based on $CO_2$ trapped).

The following example shows an improved, lower temperature, one-step process for preparation of an esterphenol-capped polyester in accordance with this invention which yields a low color product which contains only a small amount of PA.

EXAMPLE 3

Into the same apparatus used in Example 1, are charged 312 g. NPG, 290 g. para-hydroxybenzoic acid (PHBA), 148 g. PA, 146 g. AA (PHBA/NPG/AA/PA:2/3/1/1), and 200 g. Aromatic 100 solvent (a narrow-cut $C_8$-$C_{10}$ aromatic solvent marketed by Exxon Company USA).

The flask and its contents are heated to melting, stirred, and heating is continued to 150° C. where the solvent water azeotrope starts to distill out. The solvent is continuously returned to the reaction flask and the water formation is used to monitor the reaction. Heating is continued and the temperature is allowed to rise as the water is removed. After two hours, the conversion is 58% and the temperature is 175° C.; the rate of water removal and temperature rise is significantly reduced. In order to accelerate the reaction, 60 g. of the solvent is removed from the system, allowing the rate of temperature rise and water removal to increase significantly. After 4 additional hours, the temperature is 194° C. and the conversion is 87% of theoretical based on water removal. Then the temperature is raised to 198° C. for an additional 8 hours The conversion is essentially quantitative. The product in the flask is cooled to ca. 180° C., and 60 g. of Aromatic 100 is added to decrease the viscosity. The NVM is 76.4%, phenol hydroxyl number is 129, acid number is 28.3, and the reduced viscosity is 0.055 for a 10% solution in glacial acetic acid. The Gardner color is <1. The IR and NMR spectra are consistent with the desired structure, and show only a small amount (ca. 0.4 wt. %) of phthalic anhydride in the product.

In a similar manner, other polymers can be prepared by varying the monomer quantity and/or type. Other solvents can also be employed. With the changes, somewhat different temperature/time relationships will be encountered.

The following example shows the preparation of an esterphenol-capped polyester in an improved, lower temperature, two-step procedure.

EXAMPLE 4

The same apparatus used in example 1 is used except the flask is changed to 5-1. The charge is 1092 g. NPG, 1050 g. PHBA, and 400 g. Aromatic 100 solvent (a narrow-cut solvent of $C_7$-$C_9$ aromatics marketed by Exxon Company U.S.A). The flask and its contents are heated to melting, stirred, and heating is continued to 170° C. where the solvent/water azeotrope starts to distill out. The temperature is held at 170°–180° C. for 11 hours during which time 137 g. of water layer is distilled out. The flask and its contents are cooled to room temperature, and 511 g. AA and 518 g. PA are charged into the reactor. Then the flask and its contents are heated from 170°–198° C. over a period of 13 hours and 203 g. of water layer are removed. The system is cooled to about 160° C. and 544 g. Aromatic 100 solvent is added, and the resultant mixture is cooled to room temperature. The NVM is 73.6%, acid number is 42.3%, and the phenol hydroxyl number is 101. The IR and NMR spectra are consistent with the proposed esterphenol-capped polyester structure. The color is very low and only a trace of PA is in the product.

The following example shows the preparation of an esterphenol-capped polyester in a one-step procedure which is modified by raising the reaction temperature during the final stage of the reaction to increase the reaction rate.

EXAMPLE 5

Into the same apparatus used in example 3 are charged 1050 g. PHBA, 511 g. AA, 518 g. PA, 1092 g. NPG, and 150 g. xylene. The flask and its contents are heated to melting, stirring is started, and heating is continued to 154° C. where the solvent/water azeotrope starts to distill out. The temperature is increased gradually to 200° C. over a period of 5 hours, and 267 g. water (82% theoretical) is removed. The heating is continued to 230° over 6 hours and an additional 59 g. water is removed. The water removal is essentially quantitative. The product is cooled to 150° C. and 675 g. xylene is added. The contents are cooled to room temperature and discharged. The NVM is 75.9%, acid number is 23, the phenol hydroxyl number is 105, and the amount of CO2 evolution corresponds to 2.7% PHBA decarboxylation.

The following example demonstrates different catalysts that are used for the synthesis of esterphenol-capped polyesters.

EXAMPLE 6

The synthetic procedure is the same as described in Example 5, and a number of different catalysts are used in various concentrations, as shown below. The reaction temperature range, the reaction time, and the level of conversion are also shown.

| Catalysts | Catalyst Range, Wt. % | Temp. °C. | Time, Hours | Conversion, % |
|---|---|---|---|---|
| $H_3PO_4$ | 1.0 | 170–220 | 23 | 100 |
| $H_3PO_3$ | 0.2–0.45 | 165–200 | 9 | 100 |
| Sn(II) 2-ethyl-hexanoate | 0.1–0.3 | 140–220 | 10 | 96 |
| $B_2O_3$ | 0.1 | 160–230 | 12 | 91 |
| $H_3BO_3$ | 0.2–0.4 | 150–220 | 23 | 98 |
| $CH_3SO_3H$ | 0.075–0.15 | 160–200 | 10 | 100 |
| SnO | 0.1–0.2 | 180–208 | 9 | 100 |
| CaO | 0.05–0.1 | 156–215 | 12 | 99 |
| Zn Acetate | 0.24 | 165–210 | 14 | 98 |
| $As_2O_3$ | 0.1 | 190–213 | 16 | 100 |

The following example demonstrates the preparation of clear paint formulations.

EXAMPLE 7

A typical clear formulation is prepared by adding the following ingredients into a clean glass jar (or metal can):

| | |
|---|---|
| 20.6 g | of an esterphenol-capped polyester resin similar to that described in Example 2 (76.5% nonvolatile) |
| 5.2 g | hexamethoxymethyl melamine (HMMM) as Cymel– 303 |
| 1.8 g | methyl amyl ketone |
| 1.8 g | methyl ethyl ketone |
| 0.6 g | Byk-Chemie Product VP-451 diluted to 25% in n-BuOH |
| | (amine blocked catalyst, 4.45% active p-TSA after dilution with n-BuOH) |
| 30.0 g | total |

The jar or can is then capped and sealed, placed on a roller and mixed until a homogeneous solution is obtained (about 30 minutes). After mixing the jar or can is allowed to stand about another 30 minutes to remove all air bubbles. The solution is then ready for application on metal test panels via drawdown rods or spray equipment. This particular solution has the following calculated characteristics:

nonvolatile content of 70 wt. %, Cymel™ 303 (HMMM) at 25 wt. % of the binder solids (polyester+E) catalyst at 0.13 wt. % p-TSA on binder solids Similar formulations are made with many different polyester resins or esterphenol-capped polyester resins. Other variations include Cymel™ 303 concentrations between 18 and 40 wt. % of binder solids; nonvolatile contents between 50 and 75 wt. %; amine-blocked p-TSA, potassium neodecanoate, phosphorous acid or phosphoric acid catalysts; catalyst levels between 0 and 1.5 wt. % on binder solids; a variety of solvents including mixtures of xylene, EXXATE® 600 mixture of hexyl acetates sold by Exxon Chemical Company), n-BuOH, Aromatic 100, Aromatic 150, methyl amyl ketone and methyl ethyl ketone; and concentrations of the Dow Corning 57 flow additive between 0 and 0.1 wt. % of the total formulations.

For some of the more viscous resins, the procedure is altered slightly so that the polyester resin and the solvent are added to the jar first. This diluted resin solution is warmed in a steam bath and then mixed on a roller until a homogeneous solution is obtained. After this solution cools to room temperature the remaining ingredients are added and the complete formulation is again mixed on a roller to obtain a homogeneous solution.

The following example describes the preparation of pigmented paints,

EXAMPLE 8

Pigmented paints are generally prepared by grinding titanium dioxide ($TiO_2$) into the clear formulations using a high speed disk disperser such as the Byk-Chemie DISPERMAT® Model CV. First a mill base containing $TiO_2$, polyester resin or esterphenol-capped polyester resin, and solvent is ground; then this mill base is let down with the remaining ingredients in the formulation. Specific weights for one paint are given below:

Mill Base:

300 g of an esterphenol-capped polyester resin (similar to that resin described in Example 2 but NVM=85.5%)

300 g $TiO_2$ (DuPont TI-PURE® R-960)

20 g Xylene

Complete Formulation:

220 g Mill Base 9.6 g esterphenol-capped polyester resin (nonvolatile content 85.5%)

31.1 g Cymel™ 303 (HMMM)

2.0 g Byk-Chemie Product VP-451 (amine blocked p-TSA)

21.7 g EXXATE® 700 Solvent (a mixture of heptyl acetates sold by Exxon Chemical Company)

29.7 g Xylene

This particular paint has a nonvolatile content of 75.5 wt. %, a pigment/binder weight ratio of 0.8, a HMMM concentration of 24 wt. % of binder and a catalyst level of 0.27 wt. % p-TSA on binder. Other paints have been made with different resins; HMMM concentrations between 20 and 35 wt. % of binder: amine-blocked p-TSA, potassium neodecanoate or phosphoric acid catalysts: catalyst levels between 0 and 0.6 wt. % on binder; pigment/binder weight ratios between 0.8 and 1.1 and a variety of solvents including mixtures of Aromatic 100, Aromatic 150, xylene, n-BuOH, EXXATE® 600 solvent, EXXATE® 700 solvent, methyl amyl ketone and methyl ethyl ketone.

A few commercial pigment wetting/dispersing additives are also used in some paints. These include Byk-Chemie ANTI-TERRA® U, DuPont ELVACITE® AB 1015 and ICI SOLSPERSE 24000. They are used at concentrations between 1 and 2.5 wt. % active ingredient on pigment. Dow Corning 57 flow additive is also added to some formulations, typically at a concentration of 0.1 wt. % of the formulation.

The following example describes the preparation of cured films.

EXAMPLE 9

Thin films of formulations described in Examples 7 or 8 are applied to steel test panels via drawdowns and/or air spray. The basic procedures are outlined in ASTM Test Procedure D823-87, Methods A and E. Test panels are either untreated Type QD or Type S coiled rolled steel panels obtained from the Q-Panel Company or polished, BONDERITE® 1000 (iron-phosphate treatment) panels obtained from the Parker-Amchem Company. Panel sizes are either 4"×8", 3"×6", 6"×12" or 3"×5".

A model 310277 Automatic Test Panel Spray Machine made by Spraymarion, Inc. is used to spray panels (Method A above); wire-wound drawdown rods and in some cases a Precision Laboratory Drawdown Machine (both from the Paul N. Gardner Company) are used to apply films via handpulled drawdowns (Method E). Target dry film thicknesses are 1 mil.

After wet films are applied as described above, panels are allowed to flash-off solvents for about 10 minutes at room temperature. The films are then cured by baking them in a large oven. All panels lay in a horizontal position during flash-off and baking.

Baking schedules range from 10 to 60 minutes at temperatures between 220° and 350° F.

The following example describes the film property evaluations which are conducted with many of the cured panels described in Example 9.

EXAMPLE 10

| Property/Test | ASTM Reference | Comment |
|---|---|---|
| Knoop Hardness | D1474 | |
| Pencil Hardness | D3363 | 1 |
| Direct Impact | D2794 | 2 |
| Reverse Impact | D2794 | 2 |
| Flexibility | D1737 | 3 |
| Adhesion | D3359 | |
| Chemical Resistances | D1308 | 4 |
| 10% HCl | | |
| 10% NaOH | | |
| Distilled H2O | | |
| Methyl Ethyl Ketone | | |
| Xylene | | |
| Salt Spray (Fog) | B117 | 5 |
| Humidity | D2247 | 6 |
| Weathering | G53 | 7 |
| Permeability | D1653 | 8 |
| MEK Rubs | D3732 | 9 |

Comments for Example 10

1. Gouge hardness reported (not scratch hardness).

2. ⅝ inch punch with 0.64 inch die; BONDERITE® 1000 or QD panels. Values are generally higher for QD panels.

3. Cylindrical mandrel.

4. 24 hour spot tests; overall ratings: exc>good>fair>poor; exc means no problems other than film softening during exposure and full hardness recovery after 24 hr; poor indicates film lifted off surface or blistered; good and fair indicate some softening after recovery and/or visual gloss change (hazing); visual observations and pencil hardness measurements made at 1 and 24 hours exposure and after 24 hr recovery with chemical removed.

5. Panels have "X" scribe (about 1.5 in long) near bottom of panels; 0 to 10 (best) ratings according to ASTM standardized scoring system for corrosion/rusting (ASTM D610) and blister size (ASTM D714); blister frequency also according to ASTM D714; reported value is for corrosion under film after 260 hr exposure.

6. Similar scoring as for Salt Spray (comment 5 above); no scribes on these panels; reported value is again for under film corrosion but after 570 hr exposure.

7. Accelerated weathering with Quv tester employing UVB-313 bulbs from Q-Panel Company; testing cycle 4 hr UV at 60° C. alternating with 4 hr moisture at 50° C.; reported value is 20 degree gloss loss (%) after 500 hours total exposure; glosses measured in accordance with ASTM D523; observations for checking (ASTM D660), cracking (ASTM D661), chalking (ASTM D659), corrosion (ASTM D610) and blistering (ASTM D714) also made.

8. Water vapor permeability via Method B, condition B of ASTM D1653; values reported in $g/m^2/24$ hr.

9. MEK=methyl ethyl ketone; general solvent rub method described in paragraph 5.2 of ASTM D3732; maximum value tested is 250.

The following example shows that capping a polyester diol with an esterphenol substantially improves the mechanical properties of the coating film.

EXAMPLE 11

Two polyester diols and the corresponding esterphenol-capped polyester diols are prepared as in Example 1 and Example 3. The resins are used to prepare identical formulations with 35% Cymel™ 303 and 0.15% p-TSA, and clear films are made by baking 30 minutes at 350° F. The following Table I shows that films from the capped polymers had a significant improvement in hardness and weatherability. The improvement in hardness is about 7–9 Knoop hardness units, and there is total retention of the impact values. In addition, the weatherability is improved dramatically for the esterphenol-capped polyester. After 306 hours in a QUV tester, the esterphenol-capped polymer retained about 60–80% of its initial gloss, while the uncapped polymers retained only 11–15% of their gloss.

TABLE I

| Monomer | | Calc'd. M.W. | Knoop Hardness | Reverse Impact* In lb. | % QUV Gloss Retention After 306 Hrs. |
|---|---|---|---|---|---|
| Type | Ratio | | | | |
| NPG/AA/PA | 3/1/1 | 550 | 11.4 | 147 | 11 |
| NPG/AA/PA/PHBA | 3/1/1/2 | 790 | 18.1 | 157 | 81 |
| NPG/AA/PA | 5/2/2 | 1000 | 2.3 | 153 | 15 |
| NPG/AA/PA/PHBA | 5/2/2/2 | 1240 | 11.1 | 158 | 60 |

*Bonderite'® 1000 Panels

The following example shows the effects of curing conditions on hardness and impact strengths of the clear films.

EXAMPLE 12

An esterphenol-capped polyester is prepared in a method similar to that used in example 5, with the ratio of monomers NPG/AA/PA/PHBA:3/1/1/2. Clear formulations of this resin were made with 0.25% catalyst (blocked p-TSA) and various amounts of crosslinking agent (HMMM) in the manner of Example 7. Clear panels are prepared in the manner of Example 9, and the different formulations are then cured under various conditions of bake time and bake temperatures. The hardness and reverse impact values for the various panels are shown in Table II. An increase in bake time or bake temperature usually results in increased hardness and decreased reverse impact.

TABLE II

| Weight HMMM/ Polymer | Bake Temp. (°F.) | Bake Time (Min.) | Reverse Hardness (Knoop) | Impact* (In lb.) |
|---|---|---|---|---|
| 0.33 | 300 | 10 | 14.8 | 160 |
| 0.33 | | 40 | 18.5 | 160 |
| 0.33 | 350 | 10 | 19.4 | 140 |
| 0.33 | | 40 | 25.6 | 110 |
| 0.5 | 325 | 10 | 18.4 | 160 |
| 0.5 | | 40 | 21.3 | 60 |

TABLE II-continued

| Weight HMMM/ Polymer | Bake Temp. (°F.) | Bake Time (Min.) | Reverse Hardness (Knoop) | Impact* (In lb.) |
|---|---|---|---|---|
| 0.25 | 325 | 10 | 12.4 | 0 |
| 0.25 |  | 40 | 12.4 | 2 |

*Bonderite'® 1000 Panels

The following example shows the effect of catalyst level on clear film properties.

EXAMPLE 13

A resin similar to the one described in Example 12 is formulated with a ratio of 0.35/1 Cymel™ polymer and catalyzed at three levels with p-TSA. The clear panels are baked 30 minutes at 350° F. and the mechanical properties are measured. As shown in Table III, the hardness is relatively unaffected while the reverse impact increases with decreasing catalyst level.

TABLE III

| p-TSA cat., % on Polymer | Knoop Hardness | Reverse Impact* |
|---|---|---|
| 0.8 | 19.4 | 45 |
| 0.4 | 20.1 | 80 |
| 0.2 | 18.1 | 160 |

*Bonderite'® 1000 Panels

The following example shows the effect of Cymel™ 303 levels on clear film properties.

EXAMPLE 14

The same resin from Example 13 is formulated with a constant level of p-TSA catalyst (0.8%) and varying levels of Cymel™ 303 crosslinking agent. The clear panels are baked 15 minutes at 350° F. and the mechanical properties are measured. As shown in Table IV, reverse impact decrease with increasing crosslinking agent, while hardness is not affected.

TABLE IV

| Wt. Cymel~™/ Wt. Polymer | Coating Properties | |
|---|---|---|
|  | Knoop Hardness | Reverse Impact* |
| 0.35 | 20.5 | 320 |
| 0.50 | 19.7 | 160 |
| 0.65 | 20.9 | 40 |

*Bonderite'® 1000 panels

The following example lists some other esterphenol-capped polyester resins which have been synthesized

EXAMPLE 15

Several other esterphenol-capped polyester resins are synthesized via the procedures in Examples 3 and 4, and the list is shown in Table V.

TABLE V

| Monomer Composition | | | | | Mol. Wt., | Hydroxyl |
|---|---|---|---|---|---|---|
| PHBA | NPG | AA | IPA[1] | PA | Calculated | No. |
| 2 | 2 | 1 | 0 | 0 | 558 | 201 |
| 2 | 2 | 0.5 | 0.5 | 0 | 568 | 198 |
| 2 | 2.5 | 1.5 | 0 | 0 | 665 | 169 |
| 2 | 2.5 | 1.12 | 0.38 | 0 | 673 | 167 |
| 2 | 3 | 2 | 0 | 0 | 772 | 145 |
| 2.1 | 3 | 1 | 0 | 1 | 792 | 142 |
| 2 | 3 | 1 | 1 | 0 | 792 | 142 |
| 2.1 | 5 | 2 | 0 | 2 | 1240 | 91 |

[1]IPA = isophthalic acid

The following example shows that different cure catalyst systems can give very different clear film properties, and the variation in these film properties can vary with the resin system used.

EXAMPLE 16

The esterphenol-capped polyester similar to that of Example 12 and a blend of 60% of this same material with 40% of the corresponding uncapped polyester diol are prepared. Each of the materials is formulated with 33% Cymel™ 303, a mixed aromatic/alcohol solvent, catalyzed, applied to a cold rolled steel panel with a drawdown bar with a thickness sufficient to give a 1 mil baked clear film, and baked 30 minutes at 350° F. Three formulations are generated for each resin system, and different catalyst systems are used, including (1) p-toluene sulfonic acid (p-TSA) (0.14% on binder), (2) none, and (3) 0.5 wt. % potassium neodecanoate. The results, shown in Table VI, demonstrate that for the pure esterphenol-capped polymer, the base catalyzed system is superior, based on the combined properties of hardness and impact. However, for the blend of esterphenol-capped polyester and uncapped polyesterdiol, the base catalyzed system gives the poorest results, while the best results are achieved with the non-catalyzed system. The optimum choice of catalyst system depends on the resin system, and this choice varies from system to system.

TABLE VI

| Oligomer | Catalyst System | Knoop Hardness | Rev. Impact, In lbs* |
|---|---|---|---|
| (1) Esterphenol-capped polyester | p-TSA | 34 | 50 |
|  | None | 30 | 180 |
|  | Potassium Neodecanoate | 36 | 100 |
| (2) Blend of esterphenol-capped polyester and polyester diol | p-TSA | 29 | 100 |
|  | None | 22 | 180 |
|  | Potassium Neodecanoate | 4 | <10 |

*QD Panels

The following example describes the preparation of an Isophthalic acid containing esterphenol-capped polyester via a staged addition technique.

EXAMPLE 17

NPG (3.0 mole, 312 g.), isophthalic acid (IPA) (1.0 mole, 166 g.) and 130 g. of Aromatic 150 are charged to a 2-liter, 4-necked flask equipped with a stirrer driven by an air motor, a heating mantle, thermometer, and a Dean Stark trap mounted on a 10 inch column packed with 20 grams of 6 mm glass beads. A water condenser attached to the top of the Dean Stark trap to provide reflux. The reactor system is sparged with a light stream of nitrogen (40 cc/min). The effluent gas is passed through a small column containing Drierite (water trap) and subsequently through a column packed with Ascarite ($CO_2$ trap). The slurry is heated and distillation of an azeotrope containing water, Aromatic 150 and neopentyl glycol begins at 195° C. The mixture is heated for about 3 hours until all the IPA goes into solution (clear yellow solution) and the temperature rises to about 200° C. Approximately 70 g. of aqueous phase has been collected at this stage of the reaction.

The solution is cooled and the reactors are charged with AA (1.0 mole, 146 g.) and PHBA (2.0 mole, 276 g.). The aqueous overhead obtained in the first stage, and containing some codistilled NPG, is charged to a 125 ml dropping funnel which is attached to the reactor. The reaction mixture is then heated to ca. 165° C. at which time the aqueous overhead is dripped back into the reactor to return the NPG and the water is stripped overhead. After all the aqueous overhead has been recycled the temperature gradually rises to 250° C. The loss of neopentyl glycol during the reaction due to distillation is monitored by evaporation of a small sample of the aqueous overhead and determining the amount of residue. Neopentyl glycol which is lost during synthesis is replaced with fresh material so as to maintain the desired stoichiometry. When greater than 95% of the theoretical water is removed, the product is cooled and total conversion of the acid charged is determined by potentiometric titration using methanol as a solvent. The extent of decarboxylation of PHBA is calculated based on the weight of $CO_2$ trapped during the reaction as shown in Table VII of Example 18.

The following example describes the preparation of a number of IPA containing esterphenol-capped polyesters.

EXAMPLE 18

A number of different esterphenol-capped IPA containing polyesters are prepared via the procedure in Example 17. The backbone polyester diols contain various ratios of three monomers, IPA, AA, and NPG. Increasing the ratio of NPG to total diacid decreases the molecular weight of the esterphenol-capped polyester diol, and changing the ratio of AA and IPA alters the flexibility of the system. Some of the syntheses are run with phosphorous acid catalyst, while others utilized no catalyst at all. The results, shown in Table VII, include the acid number of the product, the amount of PHBA decarboxylation during the synthesis, the non-volatile matter of the final product, and the Gardner color.

The following example shows that a blend of an esterphenol-capped polyester and the corresponding polyester diol backbone from which it can be derived can have better clear film properties than the pure esterphenol-capped polyester.

EXAMPLE 19

A polyesterdiol is prepared as in Example 1 using a monomer composition of NPG/AA/PA:3/1/1. In addition, the corresponding esterphenol-capped polymer is prepared similar to Example 3, using PHBA/NPG/AA/PA:2/3/1/1. Then a blend is made of 80% esterphenol-capped polyester diol and 20% of the polyester diol. This blend is formulated with 25% Cymel™ 303 and 0.6% potassium neodecanoate, and clear panels are made and baked 30 minutes at 350° F. The pure esterphenol-capped polyester diol is formulated with 25% Cymel™ 303 and 0.15% p-TSA, and clear panels are made and baked 15 minutes at 350° F. The formulations and bake schedules are different since they have been adjusted to fit each system. The panels are evaluated in a number of tests and the results are shown in Table VIII. The results show the superiority of the blended system.

TABLE VIII

| Esterphenol Capped Polyester Property/Test | Diol | Blend |
|---|---|---|
| Knoop Hardness | 23 | 21 |
| Pencil Hardness | 4H | 5H |
| Direct Impact* | 26 | >160 |
| Reverse Impact* | 3 | >160 |
| Flexibility | ⅛ | ⅛ |
| Adhesion | 5B | 5B |
| Chemical Resistances | | |
| 10% HCl | exc | exc |
| 10% NaOH | poor | exc |
| Distilled $H_2O$ | exc | exc |
| Methyl Ethyl Ketone | good | exc |
| Xylene | good | exc |
| Salt Spray (Fog) | 8 | 10 |
| Humidity | 10 | 9 |
| Weathering | 27 | 11 |
| Permeability | 14.8 | 15.6 |
| MEK Rubs | >250 | 78 |

*Bonderite' ® 1000 Panels

The following example demonstrates blends of esterphenol-capped polyesters with a number of commercial resins.

TABLE VII

| Feed Mole Ratio | | | | Calc | | Product | Hydroxyl | PHBA Dec. | NVM | Color |
|---|---|---|---|---|---|---|---|---|---|---|
| PHBA | NPG | AA | IPA | MW | Catalyst | Acid No | Number | (%) | (%) | (Gardner) |
| 2 | 2 | 2 | 0 | 772 | None | 6.8 | 145.3 | 4.3 | 79.5 | 3 |
| 2 | 3 | 1.5 | 0.5 | 782 | $H_3PO_3$ | 1.3 | 143.5 | 2.3 | 88.0 | <1 |
| 2 | 3 | 1.5 | 0.5 | 782 | None | 7.7 | 143.5 | 3.2 | 94.5 | <1 |
| 2 | 3 | 1.5 | 0.5 | 782 | $H_3PO_3$ | 32.7 | 143.5 | — | 87.2 | 2 |
| 2 | 3 | 1.5 | 0.5 | 782 | $H_3PO_3$ | 2.0 | 143.5 | 2.8 | 81.0 | 1 |
| 2 | 4 | 3.0 | 0 | 986 | None | 2.8 | 113.8 | 4.8 | 79.3 | <1 |
| 2 | 3 | 1 | 1 | 1016 | None | 8.5 | 110.4 | 5.2 | 82.3 | 2–3 |
| 2 | 4 | 1.5 | 1.5 | 1016 | $H_3PO_3$ | 12.9 | 110.4 | 2.9 | 80.0 | 2 |
| 2 | 4 | 1.5 | 1.5 | 1016 | None | 12.6 | 110.4 | 3.2 | 88.2 | 2 |
| 2 | 5 | 3 | 1 | 1220 | None | 3.7 | 92.0 | 4.9 | 78.9 | 4 |
| 2 | 6 | 5 | 0 | 1414 | None | 7.7 | 79.3 | 3.9 | 77.7 | <1 |
| 2 | 6 | 2.5 | 2.5 | 1464 | None | 4.4 | 76.6 | 4.9 | 79.7 | 5–6 |

EXAMPLE 20

The polymer blend of Example 19, consisting of esterphenol-capped polyester diol and polyester diol, is blended with several commercial coatings resins to see if satisfactory films can be obtained. The commercial resins includes acrylic, short, medium and long oil alkyd, epoxy/phenolic, epoxy/acrylic, aromatic and aliphatic urethane, nitrocellulose, chlorinated rubber and other polyester resins. In each case 1:10 and 10:1 by solids weight blends of the esterphenol-capped polyester system and the commercial resin are prepared by appropriately combining their clear formulations. The blend from Example 19 is formulated as in Example 19, while the commercial resin clear formulations are those recommended by the manufacturers with all pigments deleted.

All solutions are first checked for incompatibilities (turbidity or separation). Those that are compatible are also drawn down, dried at room temperature and rechecked for compatibility. For the surviving compatible systems, films were then drawn down and baked using the schedule of the major resin component. Formulations which produced clear, non-tacky cured films after this baking/drying were considered compatible. Table VIII lists the specific commercial resins and their compatibilities.

TABLE IX

| Commercial Resin (manufacturer) | Resin Type | Bake Schedule | Compatible 1:10 | 10:1 |
|---|---|---|---|---|
| 57-5784 (Cargill) | polyester | 10'@35° F. | yes | yes |
| AROPLAZ 6755 (1) | polyester | 20'@325° F. | yes | yes |
| ACRYLOID AT-63 (2) | acrylic + HMMM | 30'@300° F. | yes | yes |
| ACRYLOID AT-81,85 (2) + ARALDITE 7071 (3) | acrylic + epoxy | 10'@400° F. | yes | yes |
| ARALDITE 6097 (3) + DURITE P-97 (4) | epoxy + phenolic | 30'@350° F. | yes | yes |
| AROPLAZ 6235 (2) | short-oil alkyd | 20'@300° F. | yes | yes |
| BECKOSOL 11-081 (5) | med-oil alkyd | air dry 7 days | no | no |
| BECKOSOL 10-060 (5) | long-oil alkyd | air dry 7 days | no | no |
| DESMODUR N-75 (6) | aliphatic urethane | air dry 7 days | yes | yes |
| MONDUR CB-75 (6) | aromatic urethane | air dry 7 days | yes | yes |
| PARLON S20 (7) | chlorinated rubber | air dry 7 days | no | no |
| 1/2 Second RS | Nitrocellulose | air dry 7 days | no | no |

MANUFACTURERS
(1) NL Chemicals
(2) Rohm & Haas
(3) Ciba Geigy
(4) Borden Chemical
(5) Reichhold Chemical
(6) Mobay Chemical
(7) Hercules, Inc.

The following example illustrates that a blend of a small amount of an esterphenol-capped polymer with a commercial alkyd resin improves the chemical resistance properties of the alkyd.

EXAMPLE 21

A non liquid-crystalline esterphenol-capped polyester is prepared from PHBA/NPG/AA/PA:2/3/1/1 following the procedure in Example 5. This material (80 parts) is then blended with 20 parts of the corresponding non-capped polyesterdiol (NPG/AA/PA:3/1/1). This modified esterphenol capped mixture is then used to blend with a commercial alkyd resin (Aroplaz® 6235 marketed by NL Chemicals) in the ratio of 89 wt. % alkyd and 11 wt. % modified esterphenol. The blend is formulated with 26% Cymel™ 303, 0.47% of p-TSA, a mixture of aromatic/alcohol solvent, and panels are prepared as in Example 9. The panels are compared with panels made from the alkyd without any esterphenol-capped polymer. Table X shows the results of chemical resistance testing, and demonstrates a significant improvement for the blended panels.

TABLE X

|  | 10% HCl | 10% NaOH | MEK | Xylene | Deionized Water |
|---|---|---|---|---|---|
| Alkyd | Fair | Poor | Good | Fair | Exc. |
| Blend | Exc. | Good | Exc. | Exc. | Exc. |

The following example demonstrates the importance of having an esterphenol-capped polyester resin with a Tg<40 to get good mechanical properties.

EXAMPLE 22

Three different esterphenol-capped polyester diols designated as EPCP 1, EPCP 2, and EPCP 3 in Table XI are synthesized via the procedure in Example 3; and two polyester diols designated as PEDIOL 1 (NPG/AA/PA:3/1/1:Tg= −11° C.) and PEDIOL 2 (NPG/PA:4/3:Tg=33° C.) in Table XI are synthesized via the procedure in Example 1. The Tg of the resins are determined by Torsional Braid analysis. Some of the resins are blended with each other to produce additional resins. The resins/blends are formulated with 33% Cymel™ 303, no cure catalyst, and are applied to panels which are baked for 30 minutes at 350° F. The results, shown in Table XI, demonstrate that the resins or blends of resins with Tg<40° C. formed clear films with a good combination of hardness and impact; while the resins and blends of resins with Tg>40° C. formed films with high hardness but essentially no reverse impact strength.

TABLE XI

| Type | Resin | | | | Clear Film Properties | |
|---|---|---|---|---|---|---|
| | Component % | Monomer Ratio | Calc'd MW | Tg, °C. | Hardness | Reverse Impact,* In Lbs. |
| EPCP 1 | 100 | PHBA/NPG/AA/PA 2/3/1/1 | 792 | 23 | 26 | 160 |
| EPCP 1 PEDIOL 1 | 60 40 | | 696 | 8.4 | 15 | >160 |
| EPCP 2 | 100 | PHBA/NPG/AA/IPA 2/5/2/2 | 1240 | 16 | 15 | >200 |
| EPCP 3 | 100 | PHBA/NPG/PA 2/3/2 | 812 | 49 | 36 | 0 |
| EPCP 3 PEDIOL 2 | 80 20 | | 811 | 45.7 | 24 | 0 |
| EPCP 3 PEDIOL 2 | 60 40 | | 810 | 42.4 | 24 | 0 |

*QD Panels

The following example demonstrates preparation of an esterphenol-capped acrylic resin.

EXAMPLE 23

Into a 1-l flask equipped with a stirrer, heating mantle, Dean Stark trap, and nitrogen purging system, are placed 400 g of an acrylic resin (NVM 66.7%) with a monomer composition of 28.4 mole % hydroxyethyl methacrylate, 23.6 mole % styrene, and 48.6 mole % butyl acrylate. Then 0.3 g. p-TSA in 100 g xylene and 86.2 g PHBA is added, and the system is sparged with nitrogen (ca. 40 cc/min.).

The mixture is heated with stirring and water evolution begins at ca. 166° C. After an additional heating period of 5 hours, 81% of the theoretical amount of water has been formed. The product is cooled to room temperature and discharged. The phenolic hydroxyl number is 102 mg. KOH/g. polymer, and the aliphatic hydroxyl number is 19.3 mg. KOH/g. polymer.

The following example demonstrates preparation of a pigmented formulation and properties of panels made from it.

EXAMPLE 24

An esterphenol-capped polyester/polyester diol blend similar to the ones described in Example 18 is formulated with titanium dioxide pigment, the ICI dispersing agent SOLSPERSE 24000 and the Dow Corning 57 flow additive. The formulation is prepared according to the procedures outlined in Example 7 with the following specifications:

| MILL BASE (by weight) | |
|---|---|
| Polyester diol (71.4% solids) | 7.5 |
| SOLSPERSE 24000 solution (24% solids) | 2.5 |
| TiO₂ (DuPont TI-PURE' R-960) | 31.7 |
| LET-DOWN (by weight) | |
| esterphenol-capped polyester diol (73.6% solids) | 27.5 |
| Polyester diol (71.4% solids) | 5.7 |
| HMMM (American Cyanamid Cymel- 303) | 14.8 |

-continued

| Dow Corning 57 (diluted to 25 wt % in n-BuOH) | 0.3 |
|---|---|
| n-Butanol | 7.8 |
| Aromatic 100 | 7.2 |
| TOTAL (by weight) | 100.0 |

Panels are drawn down as described in Example 8 and baked with a schedule of 30° at 350° F. Films are then evaluated using some of the procedures outlined in Example 9. The following combination of properties is obtained:

| Knoop Hardness | 13 |
|---|---|
| Direct Impact | >160 in lb |
| Reverse Impact | 93 in lb |
| 20 Degree Gloss | |
| Initial | 72 |
| After 250 hr Quv | 36 |

The following example demonstrates that alkali metal salts of weak bases catalyze the decarboxylation of PHBA during an esterification reaction.

EXAMPLE 25

A polyester diol is prepared as in Example 5. This diol is then reacted with PHBA samples containing various amounts of the potassium salt of PHBA, which are prepared by neutralization of PHBA with KOH followed by evaporation of the contained water. The reaction of the diol with the various PHBA samples is conducted as follows: 138 g. polyester diol, 92 g. PHBA, the appropriate level of the potassium salt of PHBA, and 50 g. Aromatic 150 are placed in a 1-liter 4-necked flask equipped with a thermometer, mechanical stirrer, heating mantle, Dean Stark trap, and a nitrogen inlet tube. A water chilled condenser is attached to the top of the Dean Stark trap. The reactor system is sparged with a light stream of nitrogen (40 cc/min). The effluent gas is passed through a small column containing Drierite (water trap) and subsequently through a column packed with Ascarete ($CO_2$ trap). The slurry is heated with stirring and the progress of the reaction is maintained by plotting the percent water formed vs. reaction time. The extent of decarboxylation is determined at the end of the reaction time allowed from the weight of carbon dioxide which is trapped. The results are shown in Table XII. The percent of PHBA esterified is represented by "% PHBA Ester", and the percent decarboxylated is represented by "% PHBA Decarb".

The results clearly show that higher potassium levels are associated with increased PHBA decarboxylation and resultant destruction along with decreased PHBA esterification and incorporation into the esterphenol-capped oligomer.

TABLE XII

| Polyester, g. | PHBA, g. | Potassium (ppm) | % PHBA Ester | % PHBA Decarb |
|---|---|---|---|---|
| 137.8 | 91.9 | 6 | 65.1 | 12.3 |
| 138.6 | 92.5 | 81 | 55.3 | 15.6 |
| 142.0 | 94.2 | 1781 | 23.6 | 74.6 |
| 136.6 | 91.1 | 6356 | 10 | 85.7 |

The following example demonstrates the preparation of an esterphenol-capped simple diol.

EXAMPLE 26

Into the same apparatus as used in Example 1, but 1 liter volume, are charged 200 g. 1,12-dodecanediol, 290 g. PHBA, 5 g. phosphoric acid and 100 g. xylene. The flask and its contents are heated to melting, then stirred, and heating is continued to 170° C. where the solvent-water azeotrope starts to distill out. The solvent is continuously returned to the reaction flask and water formation is used to monitor the reaction. Heating is continued and the temperature is allowed to rise as the water is removed. After six hours, the conversion is 56% and the temperature is 199° C. The temperature is kept at 200°–210° C. over an additional 21 hours. The conversion is essentially quantitative. The contents are cooled and discharged. The diester, which is a white solid, is dissolved in acetone, and precipitated by addition of distilled $H_2O$. The resulting solid material is filtered and dried. The solid has a molecular weight of 440 and a phenol hydroxyl number=255.

The following example shows the preparation of esterphenol-capped polyester having a number average molecular weight of about 4000.

EXAMPLE 27

Into a 5-liter four-necked flask equipped with a mechanical stirrer, heating mantle, nitrogen sparger, 10 inch column, on top of which is a Dean Stark trap and chilled water condenser, and thermometer fitted with a temperature controller, are charged 394 g. of phthalic anhydride (PA), 742 g. of isophthalic acid (IPA), 1042 g. of neopentyl glycol (NPG), and 150 g. Aromatic 100 solvent (a narrow-cut solvent of $C_9$-$C_{12}$ aromatics marketed by Exxon Company USA). The contents are heated to melting, stirred, and heating is continued to about 170° C. where the solvent/water azeotrope starts to distill out. Water removal is used to maintain the reaction. Heating is continued and the temperature allowed to rise as the water is removed to a final temperature of –220° C. The total overhead collected, which is principally a mixture of neopentyl glycol and water, is 243 g. The reaction mixture is cooled and charged with 347 g. of adipic acid (AA) and 138 g. of p-hydroxybenzoic acid (PHBA). The contents of the reactor are stirred and heating is continued until the temperature reaches about 140° C. The overhead collected in the first phase of the reaction is then added dropwise in order to strip the water present in the overhead away from the NPG. Heating is continued and the temperature slowly rises to 250° C. as the water formed due to the reaction distills. The reaction is stopped after the theoretical amount of water is removed which takes about 19 hours. The reaction product is cooled and the acid number is determined (7.0 mgs. ROH/g). The product is then diluted by adding 633 g. of ethyl 3-ethoxy propionate (EEP) and 510 g. of Aromatic 100 solvent. The non volatile material (NVM) measured is 65.5% (1 hour at 150° C.). The reduced viscosity of a 10% (w/v)of the resin (100% basis) in a 50/50 mixture of glacial acetic acid and methyl amyl ketone (MAK) is 0.182 and the number average molecular weight is about 4,000. This polyester can be abbreviated as follows: NPG/AA/PA/IPA/PHBA:20/4.75/5.32/8.93/2

Paints were prepared as described in Example 8 and panels were made as described in Example 9. The coatings exhibited excellent mechanical properties—e.g., 0 T-bend, reverse impact of greater than 200, hardness values of 16 Knoops and 2 H pencil hardness, MEK rubs of greater than 250 and a cross hatch adhesion of 5 B.

What is claimed:

1. A process for preparing an hydroxybenzoic acid-capped polymer represented by the formula:

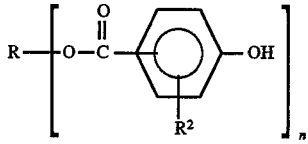

wherein
R is a polyvalent radical with a number average molecular weight between about 200 and 10,000 derived from a polymer having at least 2 aliphatic hydroxy groups;
$R^2$ is hydrogen, hydroxy, halo, $C_{1-4}$ alkyl, $C_{1-4}$ alkoxy, or $C_{1-4}$ alkoxycarbonyl; and
n is an integer between 2 and 10, inclusive;
comprising the step of directly esterifying a substantial amount of the aliphatic hydroxy-functional polymer with an effective amount of an hydroxybenzoic acid at a reaction temperature below about 200° C.

2. The process of claim 1 wherein the reaction temperature is between about 140° and 200° C.

3. The process of claim 2 wherein greater than 5 weight percent of the aliphatic hydroxy-functional polymer is esterified thereby forming the hydroxybenzoic acid-capped polymer.

4. The process of claim 3 wherein greater than 70 weight percent of the aliphatic hydroxy-functional polymer is esterified thereby forming the hydroxybenzoic acid-capped polymer.

5. The process of claim 4 wherein greater than 80 weight percent of the aliphatic hydroxy-functional polymer is esterified thereby forming the hydroxybenzoic acid-capped polymer.

6. The process of claim 5 wherein the amount of hydroxybenzoic acid used to esterify the aliphatic hydroxy-functional polymer ranges from about 0.05 to 1.25 equivalents of hydroxybenzoic acid to 1.0 equivalents of polymer.

7. The process of claim 6 wherein the amount of hydroxybenzoic acid used to esterify the aliphatic hydroxy-functional polymer ranges from about 0.25 to 1.0 equivalents of hydroxybenzoic acid to 1.0 equivalents of polymer.

8. The process of claim 7 wherein the hydroxybenzoic acid is PHBA.

9. The process of claim 8 wherein the esterification reaction mixture contains no greater than 0.2 weight percent of an alkaline or alkaline earth metal salt of a weak acid.

10. The process of claim 9 wherein the esterification reaction mixture contains no greater than 0.01 weight percent of an alkaline or alkaline earth metal salt of a weak acid.

11. The process of claim 10 wherein the esterification reaction mixture contains no greater than 0.001 weight percent of an alkaline or alkaline earth metal salt of a weak acid.

12. The process of claim 11 wherein the salt of a weak acid is the potassium salt of PHBA or potassium phenolate.

13. The process of claim 12 wherein the esterification reaction mixture contains a catalytically effective amount of a strong acid catalyst.

14. The process of claim 13 wherein the acid catalyst is an alkyl or aromatic sulfonic acid or a blocked alkyl or aromatic sulfonic acid.

15. The process of claim 14 wherein the strong acid catalyst is para-toluene sulfonic acid or methane sulfonic acid.

16. The process of claim 15 wherein the aliphatic hydroxy-functional polymer is prepared in situ by reacting in the presence of the hydroxybenzoic acid a $C_{2-8}$ polyhydric alcohol and a polybasic acid or acid derivative.

17. The process of claim 16 further comprising the step of increasing the final reaction temperature above 200° C. thereby esterifying residual aliphatic hydroxy-functional polymer.

18. The process of claim 17 wherein the final reaction temperature is between about 200° and 230° C.

19. A process for preparing an hydroxybenzoic acid-capped polymer represented by the formula:

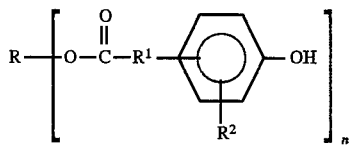

wherein

R is a polyvalent radical with a number average molecular weight between about 200 and 10,000 derived from a polymer having at least 2 aliphatic hydroxy groups;

$R^1$ is a direct bond, $C_{1-20}$ hydrocarbylene, or $C_{1-20}$ oxyhydrocarbylene;

$R^2$ is hydrogen, hydroxy, halo, $C_{1-4}$ alkyl, $C_{1-4}$ alkoxy, or $C_{1-4}$ alkoxycarbonyl; and n is an integer between 2 and 10, inclusive;

comprising the steps of reacting a molar excess of a $C_{2-8}$ polyhydric alcohol with an hydroxybenzoic acid at a reaction temperature below about 200° C. thereby partially esterifying the polyhydric alcohol, and then reacting while maintaining the reaction temperature below about 200° C. the reaction mixture of the partially esterified polyhydric alcohol and the $C_{2-8}$ polyhydric alcohol with at least one polybasic acid or acid derivative in an amount effective to achieve a number average molecular weight between about 200 and 10,000.

20. The process of claim 19 wherein the reaction temperature is between about 140° and 200° C.

21. The process of claim 20 wherein the molar ratio of $C_{2-8}$ polyhydric alcohol to the hydroxybenzoic acid ranges from about 1:1 to 10:1.

22. The process of claim 21 wherein the hydroxybenzoic acid is PHBA.

23. The process of claim 22 wherein the esterification reaction mixture contains no greater than 0.2 weight percent of an alkaline or alkaline earth metal salt of a weak acid.

24. The process of claim 23 wherein the esterification reaction mixture contains no greater than 0.01 weight percent of an alkaline or alkaline earth metal salt of a weak acid.

25. The process of claim 24 wherein the esterification reaction mixture contains no greater than 0.001 weight percent of an alkaline or alkaline earth metal salt of a weak acid.

26. The process of claim 25 wherein the salt of a weak acid is the potassium salt of PHBA or potassium phenolate.

27. The process of claim 1 wherein the esterification reaction mixture contains a catalytically effective amount of a strong acid catalyst.

28. The process of claim 27 wherein the acid catalyst is an alkyl or aromatic sulfonic acid or a blocked alkyl or aromatic sulfonic acid.

29. The process of claim 28 wherein the strong acid catalyst is para-toluene sulfonic acid or methane sulfonic acid.

30. A process for preparing an hydroxybenzoic acid-capped polyhydric alcohol represented by the formula:

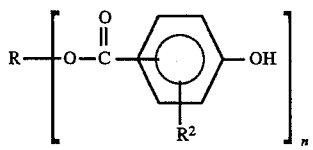

wherein

R is a polyvalent radical derived from a $C_{12-40}$ polyhydric alcohol;

$R^2$ is hydrogen, hydroxy, halo, $C_{1-4}$ alkyl, $C_{1-4}$ alkoxy, or $C_{1-4}$ alkoxycarbonyl; and n is an integer between 2 and 10, inclusive;

comprising the step of directly esterifying a substantial amount of the $C_{12-40}$ polyhydric alcohol with an effective amount of an hydroxybenzoic acid at a reaction temperature below about 200° C.

31. The process of claim 30 wherein the reaction temperature is between about 140° and 200° C.

32. The process of claim 31 wherein greater than 5 weight percent of the $C_{12-40}$ polyhydric alcohol is esterfied thereby forming the hydroxybenzoic acid-capped polyhydric alcohol.

33. The process of claim 32 wherein greater than 70 weight percent of the $C_{12-40}$ polyhydric alcohol is esterfied thereby forming the hydroxybenzoic acid-capped polyhydric alcohol.

34. The process of claim 33 wherein greater than 80 weight percent of the $C_{12-40}$ polyhydric alcohol is esterfied thereby forming the hydroxybenzoic acid-capped polyhydric alcohol.

35. The process of claim 34 wherein the amount of hydroxybenzoic acid used to esterify the $C_{12-40}$ polyhydric alcohol ranges from about 0.05 to 1.25 equivalents of hydroxybenzoic acid to 1.0 equivalents of $C_{12-40}$ polyhydric alcohol.

36. The process of claim 35 wherein the amount of hydroxybenzoic acid used to esterify the $C_{12-40}$ polyhydric alcohol ranges from about 0.25 to 1.0 equivalents of hydroxybenzoic acid to 1.0 equivalents of $C_{12-40}$ polyhydric alcohol.

37. The process of claim 36 wherein the hydroxybenzoic acid is PHBA.

38. The process of claim 37 wherein the esterification reaction mixture contains no greater than 0.2 weight percent of an alkaline or alkaline earth metal salt of a weak acid.

39. The process of claim 38 wherein the esterification reaction mixture contains no greater than 0.01 weight percent of an alkaline or alkaline earth metal salt of a weak acid.

40. The process of claim 39 wherein the esterification reaction mixture contains no greater than 0.001 weight percent of an alkaline or alkaline earth metal salt of a weak acid.

41. The process of claim 40 wherein the salt of a weak acid is the potassium salt of PHBA or potassium phenolate.

42. The process of claim 41 wherein the esterification reaction mixture contains a catalytically effective amount of a strong acid catalyst.

43. The process of claim 42 wherein the strong acid catalyst is para-toluene sulfonic acid or methane sulfonic acid.

44. The process of claim 43 further comprising the step of increasing the final reaction temperature above 200° C. thereby esterifying residual $C_{12-40}$ polyhydric alcohol.

45. The process of claim 44 wherein the final reaction temperature is between about 200° and 230° C.

46. A process for preparing a composition comprising a non-liquid crystalline, esterphenol-capped polymer represented by the formula:

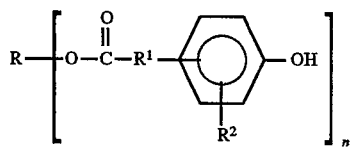

wherein R is a polyvalent radical with a number average molecular weight between about 200 and 10,000 derived from a hydroxy functional $C_{12}$ to $C_{40}$ polyhydric alcohol, wherein:

$R^1$ is a direct bond, $C_{1-20}$ hydrocarbylene, or $C_{1-20}$ oxyhydrocarbylene;

$R^2$ is hydrogen, hydroxy, halo, $C_{1-4}$ alkyl, $C_{1-4}$ alkoxy, or $C_{1-4}$ alkoxycarbonyl; and n is an integer between 2 and 10, inclusive;

said process comprising:

a) forming a mixture of said hydroxy functional reactant and a hydroxy aromatic acid having the formula:

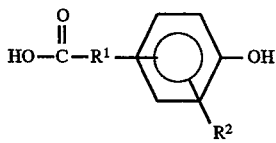

b) heating said mixture, optionally in the presence of an esterification catalyst, at a temperature in the range of from about 140° C. to about 200° C. to form said esterphenol capped polymer.

47. The process of claim 46 wherein said hydroxy aromatic acid is para-hydroxybenzoic acid.

48. The process of claim 47 wherein a molar excess of a $C_{2-8}$ polyhydric alcohol is reacted with an hydroxybenzoic acid at a reaction temperature below about 200° C. thereby partially esterifying the polyhydric alcohol, and then reacting while maintaining the reaction temperature below about 200° C. the reaction mixture of the partially esterified polyhydric alcohol and the $C_{2-8}$ polyhydric alcohol with at least one polybasic acid or acid derivative.

49. The process of claim 46 wherein said polyhydric alcohol is a dial.

50. The process of claim 49 wherein said dial is 1,12-dodecanediol.

51. The process of claim 46 wherein said heating is a two stage heating comprising heating in a second stage to a temperature above the temperature of the first stage and up to about 230° C.

* * * * *